(12) United States Patent
Hama

(10) Patent No.: US 7,156,558 B2
(45) Date of Patent: Jan. 2, 2007

(54) LINEAR MOTION DRIVE SYSTEM

(75) Inventor: Tomio Hama, Okaya (JP)

(73) Assignee: Yugen Kaisha Hama International, Nagano (JP)

( * ) Notice: Subject to any disclaimer, the term of this patent is extended or adjusted under 35 U.S.C. 154(b) by 154 days.

(21) Appl. No.: 10/923,675

(22) Filed: Aug. 24, 2004

(65) Prior Publication Data

US 2005/0047688 A1   Mar. 3, 2005

(30) Foreign Application Priority Data

Aug. 25, 2003   (JP) ............................. 2003-208666

(51) Int. Cl.
*F16C 29/06*   (2006.01)

(52) U.S. Cl. .......................................... 384/57; 384/10

(58) Field of Classification Search .................... 384/7, 384/10, 38, 39, 40, 43–45, 49, 50–59
See application file for complete search history.

(56) References Cited

U.S. PATENT DOCUMENTS 4,231,621 A * 11/1980 Teramachi .................... 384/45
4,515,414 A * 5/1985 Werth, Jr. .................... 384/39
5,273,367 A   12/1993 Tanaka
6,174,084 B1 * 1/2001 Pauwels et al. ............... 384/45
6,179,468 B1 * 1/2001 Thorstens et al. ............. 384/40
6,679,631 B1 * 1/2004 Iida ............................ 384/58

FOREIGN PATENT DOCUMENTS

EP   577995 A2 * 1/1994
JP   7-54843 A   2/1995
JP   2002-122136 A   4/2002

* cited by examiner

*Primary Examiner*—Thomas R. Hannon
(74) *Attorney, Agent, or Firm*—Birch, Stewart, Kolasch & Birch, LLP

(57) ABSTRACT

The linear motion drive system is capable of automatically remove a clearance between a moving body and a linear shaft when the moving body and/or the linear shaft is abraded. The linear motion drive system comprises: the moving body linearly and reciprocally moved along the linear shaft; a contact body contacting the linear shaft; and a pressure unit provided to the moving body, the pressure unit pressing the contact body so as to apply pressure to the linear shaft. The pressure unit includes: a press section contacting and pressing the contact body; a biasing member biasing the press section toward the linear shaft; and a locking mechanism holding the press section.

8 Claims, 15 Drawing Sheets

LINEAR MOTION DRIVE SYSTEM

This Non-provisional application claims priority under 35 U.S.C. §119(a) on Patent Application No(s). 2003-208666 filed in Japan on Aug. 25, 2003, the entire contents of which are hereby incorporated by reference.

BACKGROUND OF THE INVENTION

The present invention relates to a linear, motion drive system in which a moving body or a linear shaft linearly reciprocally moves.

In a conventional linear motion drive system having a moving body linearly reciprocally moving along a linear shaft, e.g., a rail, pressure is applied to the moving body and the linear shaft so as to smoothly move the moving body without looseness.

One of the conventional linear motion drive system is disclosed in Japanese Patent Gazette No. 2002-122136. In the drive system, metal balls are provided between a linear moving body and a linear shaft (a rail) so as to smoothly linearly move the moving body along the linear shaft. To apply pressure to the moving body and the linear shaft, diameters of the balls are slightly greater than a clearance between the moving body and the linear shaft.

By employing the balls disclosed in the Japanese Patent Gazette No. 2002-122136, the clearance between the moving body and the linear shaft can be securely filled with the balls, so that looseness there between can be removed. Therefore, the drive system is capable of suitably linearly conveying a heavy article, whose weight is several hundreds kilogram.

However, in the conventional system disclosed in the Japanese Patent Gazette No. 2002-122136, the diameters of the metal balls are greater than the clearance between the moving body and the linear shaft, so the balls must be deformed. By the deformation of the balls, the balls cannot smoothly roll, so that resistance against the linear motion of the moving body must be great. Thus, a greater power is required to move the moving body. Further, the moving body, the linear shaft and the balls are required to have high abrasion resistance, or they must be hardened. Therefore, manufacturing cost of the drive system must be high, the drive system must be large and heavy, and energy consumption of the drive system must be increased. To smoothly roll the balls and prevent damage of the moving body, the linear shaft and the balls, a large amount of lubricant must be frequently supplied, so that maintenance cost must be high.

In the case of linearly conveying a light article, the large and high cost drive system is not required. For example, a linear motion drive system disclosed in Japanese Patent Gazette No. 7-54843 may be employed. In the drive system, a biasing member, e.g., a coil spring, biases a linear moving body toward a linear shaft, e.g., a linear guide rail. Contact bodies, e.g., lubricant elements, are provided between the moving body and the linear shaft, so that pressure is applied to the linear shaft via the moving body and the contact bodies.

In the drive system disclosed in the Japanese Patent Gazette No. 7-54843, the resistance to the linear motion of the moving body is smaller than that of the drive system disclosed in the Japanese Patent Gazette No. 2002-122136. Therefore, the drive system can be made of light materials, manufacturing cost and maintenance cost of the drive system can be lower.

However, in the drive system disclosed in the Japanese Patent Gazette No. 7-54843, if an external force, which is greater than the elasticity of the biasing member, is applied to the contact bodies, the biasing member is deformed, so that the moving body loosely moves.

To solve this problem, the biasing member having great elasticity, which is greater than a maximum external force expected, was employed to increase the pressure to the linear shaft.

However, it makes frictional resistance between the contact bodies and the linear shaft greater, and the biasing member must be larger. Therefore, manufacturing cost of the drive system must be high, the drive system must be large and heavy, and energy consumption of the drive system must be increased.

SUMMARY OF THE INVENTION

The present invention is invented to solve the problems of the conventional linear motion drive systems.

An object of the present invention is to provide a linear motion drive system, which is capable of automatically remove a clearance between a moving body and a linear shaft so as to perform linear motion without looseness even if the moving body and/or the linear shaft is abraded.

To achieve the object, the present invention has following structures.

Namely, the linear motion drive system of the present invention comprises:
a base;
a linear shaft being fixed to the base;
a moving body being linearly and reciprocally moved along the linear shaft;
a contact body contacting the linear shaft; and
a pressure unit being provided to the moving body, the pressure unit pressing the contact body so as to apply pressure to the linear shaft,
wherein the pressure unit includes:
a press section contacting and pressing the contact body toward the linear shaft;
a biasing member biasing the press section toward the linear shaft; and
a locking mechanism holding the press section so as not to move away from the linear shaft.

Another linear motion drive system comprises:
a base;
a guide section being provided to the base;
a linear shaft being linearly and reciprocally moved along the guide section;
a contact body contacting the linear shaft; and
a pressure unit being provided to the base, the pressure unit pressing the contact body so as to apply pressure to the linear shaft,
wherein the pressure unit includes:
a press section contacting and pressing the contact body toward the linear shaft;
a biasing member biasing the press section toward the linear shaft; and
a locking mechanism holding the press section so as not to move away from the linear shaft.

In each of the linear motion drive systems, the biasing member of the pressure unit biases the press section so as to apply pressure via the contact body. On the other hand, a counter force is applied to the press section, but the locking mechanism holds the press section so as not to move the press section away from the linear shaft. With this structure, no clearance is formed between the contact body and the linear shaft even if a great force is applied to the contact body and the press section. Therefore, the drive system can be operated without looseness or play. Further, stress in the locking mechanism opposes against the force applied to the press section from the linear shaft, so the pressure applied by the biasing member need not be great. Even if the linear shaft and/or the contact body is abraded, the biasing member moves the press section and the contact body toward the linear shaft and the locking mechanism prevents the both from returning. Therefore, the clearance between the contact body and the linear shaft can be removed, so that the drive system can be operated without looseness or play.

In the linear motion drive system, the locking mechanism may include:

a cylinder;

a piston sliding in the cylinder;

a piston rod being fixed to the piston, the piston rod having one end, which is directly or indirectly contacts the contact body as the press section;

a first chamber being formed in the cylinder, capacity of the first chamber being reduced when the piston is moved to press the contact body with the piston rod;

a second chamber being formed in the cylinder, capacity of the second chamber being increased when the piston is moved to press the contact body with the piston rod;

an interchamber path communicating the first chamber with the second chamber; and a check valve being provided in the interchamber path, the check valve allowing a fluid to flow from the first chamber to the second chamber but prohibiting the fluid to flow from the second chamber to the first chamber.

With this structure, the check valve allows the fluid to flow from the first chamber to the second chamber but prohibits the fluid to flow from the second chamber to the first chamber. Therefore, the contact body cannot move away from the linear shaft. Namely, the locking mechanism is capable of maintaining the contact body to contact the linear shaft.

In the linear motion drive system, the first chamber may be formed on one side of the piston, and the second chamber may be formed on the other side of the piston.

In the linear motion drive system, the check valve may be detachably attached in the interchamber path.

The locking mechanism usually allows the piston rod to move in one direction only but prohibits the same to move in the reverse direction. Namely, it is usually impossible to return the piston rod to an initial position and reuse the pressure unit. By employing the detachable check valve, the locking function of the locking mechanism can be released by detaching the check valve from the interchamber path. Therefore, the piston rod can be moved in the reverse direction, and the pressure unit can be reused.

In the linear motion drive system, the locking mechanism may further include:

a first communication path communicating the first chamber with outside of the cylinder;

a second communication path communicating the second chamber with outside of the cylinder; and a detachable closing member closing the first communication path and the second communication path.

With this structure, the first and second chambers can be communicated with outside of the cylinder by detaching the closing member, so that the locking function of the locking mechanism can be released. Therefore, the piston rod can be moved in the reverse direction, and the pressure unit can be reused. In the linear motion drive system, the other end of the piston rod may be capable of projecting outward from the cylinder, the piston rod may have a hollow section, which is opened at the other end, a first hole communicating the first chamber with the hollow section, and a second hole, which communicating the second chamber with the hollow section, a closing member may be detachably attached in the hollow section, the closing member has a closing section, which closes the hollow section at a position on the other end side with respect to the first and second holes, and an extended section, which is extended from the closing section to a position in the hollow section and between the first hole and the second hole, and the check valve may be provided between an outer face of the extended section and an inner face of the hollow section.

With this structure, the check valve can be detached from the interchamber path and the first and second holes can be communicated with outside via the hollow section, etc. by detaching the closing member, so that the locking function of the locking mechanism can be released. Therefore, the piston rod can be easily moved in the reverse direction, and the pressure unit can be reused.

In the linear motion drive system, the first chamber may be formed on the contact body side with respect to the piston, the second chamber is formed on the opposite side, a hollow section may be formed in the piston, one end of the hollow section, which located on the second chamber side, is opened, a shaft member may be provided in the second chamber, a front end of the shaft member may be loosely inserted in the hollow section, the interchamber path may be constituted by the hollow section, a third hole, which communicates the first chamber with the hollow section, and a space between an outer face of the shaft member and an inner face of the hollow section, the shaft member may include a hollow section, which communicates with the hollow section and which is opened in the end face of the cylinder, and a fourth hole, which communicates the second chamber with the hollow section, and a closing member, which closes the fourth hole, may be detachably attached in the hollow section.

With this structure, by detaching the closing member, the first chamber can be communicated with outside via the third hole, the hollow section and another hollow section of the shaft member and the second chamber can be communicated with outside via the fourth hole and the hollow section, so that the locking function of the locking mechanism can be easily released. Therefore, the piston rod can be moved in the reverse direction, and the pressure unit can be reused.

In the linear motion drive system, the second chamber may be formed on the contact body side with respect to the piston, the first chamber is formed on the opposite side, a hollow section may be formed in the piston, one end of the hollow section, which located on the first chamber side, is opened, a shaft member may be provided in the first chamber, a front end of the shaft member may be loosely inserted in the hollow section, the interchamber path is constituted by the hollow section, a third hole, which communicates the second chamber with the hollow section, and a space between an outer face of the shaft member and an inner face of the hollow section, the shaft member may include a hollow section, which communicates with the hollow section and which is opened in the end face of the cylinder, and a fourth hole, which communicates the first chamber with the hollow section, and a closing member, which closes the fourth hole, may be detachably attached in the hollow section.

With this structure, by detaching the closing member, the second chamber can be communicated with outside via the third hole, the hollow section and another hollow section of the shaft member and the first chamber can be communicated with outside via the fourth hole and the hollow section, so that the locking function of the locking mechanism can be easily released. Therefore, the piston rod can be moved in the reverse direction, and the pressure unit can be reused.

In the linear motion drive system, the biasing member may be provided in the cylinder so as to bias the piston or piston rod. With this structure, the pressure unit can be small.

In the linear motion drive system, the biasing member may be provided in the first or second chamber. With this structure, the pressure unit can be smaller. In the linear motion drive system, the press section may include: a first screw member being capable of moving toward the contact body but being prohibited to rotate, the first screw member having one end, which directly or indirectly contacts the contact body, and the other end, in which a screw section is formed; and a second screw member having a screw section screwed with the screw section of the first screw member, the second screw member moving the first screw member toward the contact body when the second screw member is rotated in a prescribed direction, the biasing member may be a spiral spring, whose one end is fixed to the pressure unit and whose the other end is fixed to the second screw member, the spiral spring may bias the second screw member in a prescribed rotational direction, and the locking mechanism may be constituted by the screw sections of the first and second screw members.

With this structure, the first screw member can be moved to press the contact body by rotating the second screw member in the prescribed direction. The first screw member is held by the screw sections, so that the first screw member is not moved away from the contact body by a counter force from the contact body. Therefore, the locking mechanism is capable of holding the first screw member.

In the linear motion drive system, the pressure unit may include:

a rotor being coaxial with the second screw member, the rotor being rotatably provided to a pressure unit proper;

a ratchet mechanism allowing the rotor to rotate in a prescribed direction but prohibiting to rotate in the reverse direction, and the one end of the spiral spring may be fixed to the rotor, the spiral spring may be wound by rotating the rotor in the prescribed direction so that the spiral spring is capable of biasing the second screw member in the prescribed direction.

With this structure, the spiral spring can be wound by rotating the rotor in the prescribed direction. The biasing force of the spiral spring, which applies the pressure to the linear shaft, can be suitably adjusted. If the spiral spring is not wound, no pressure is applied, the first screw member of the press section can be moved away from the linear shaft, so that the pressure unit can be easily treated.

In the linear motion drive system, a detachable guide member may guide the first screw member toward the contact body but prohibits the same to rotate with respect to a pressure unit proper, and the first screw member may be manually rotated when the guide member is detached.

With this structure, the locking mechanism usually allows the first screw member to move in one direction only but prohibits the same to move in the reverse direction. Namely, it is usually impossible to return the first screw member to an initial position and reuse the pressure unit. By employing the detachable guide member, the locking function of the locking mechanism can be released by detaching the guide member. Therefore, the first screw member can be moved to the initial position, and the pressure unit can be reused.

In the linear motion drive system, the contact body may be a roller unit. With this structure, friction between the contact body and the linear shaft can be reduced.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

First Embodiment

A first embodiment will be explained.

Figure 1:
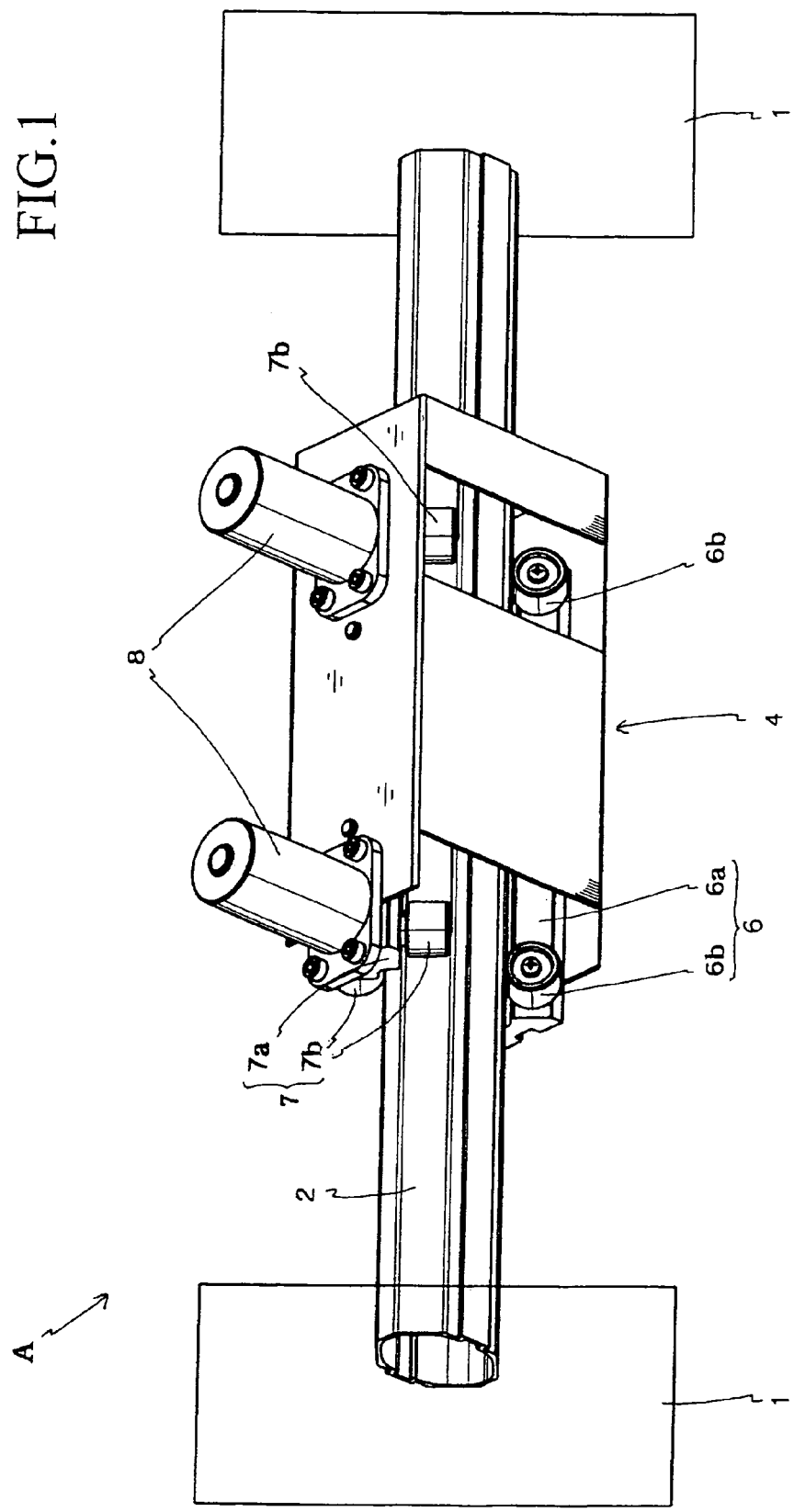
FIG. 1 is a perspective view of a first embodiment of the linear motion drive system of the present invention.
Figure 2:
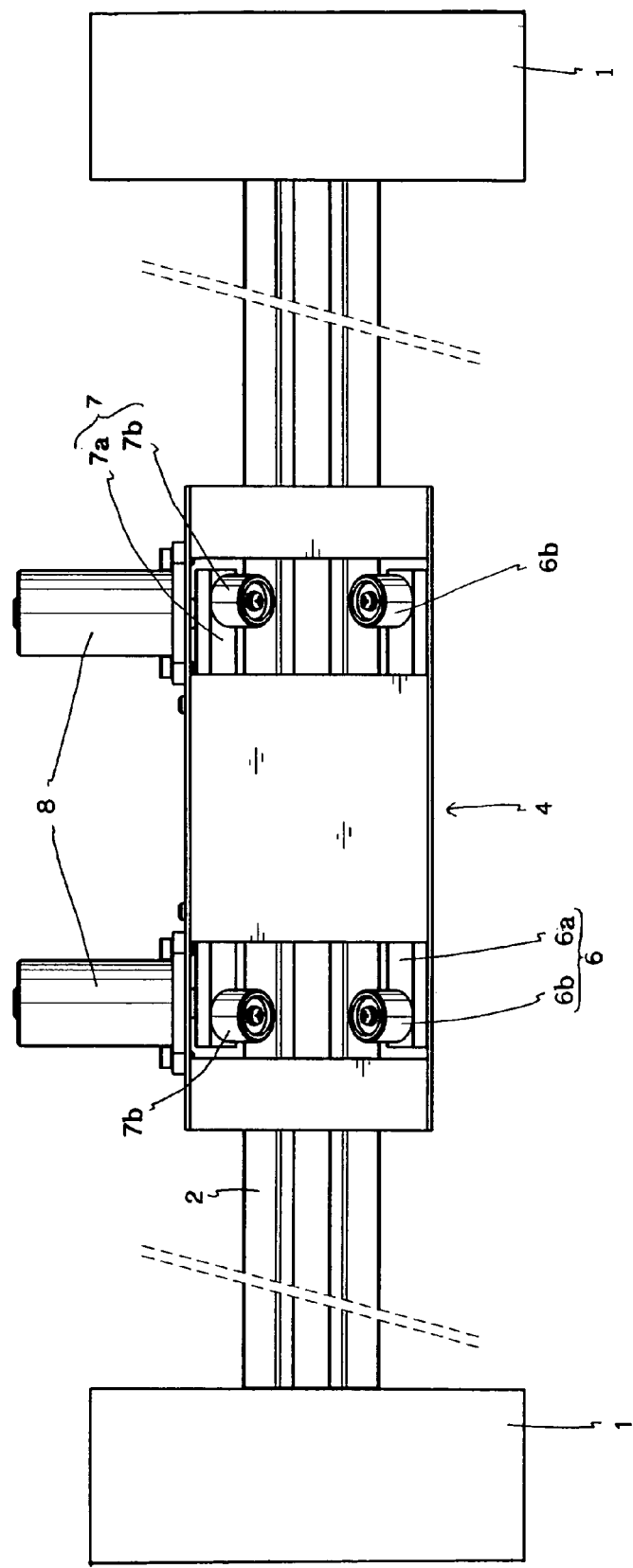
FIG. 2 is a front view of the linear motion drive system shown in FIG. 1.
Figure 3:
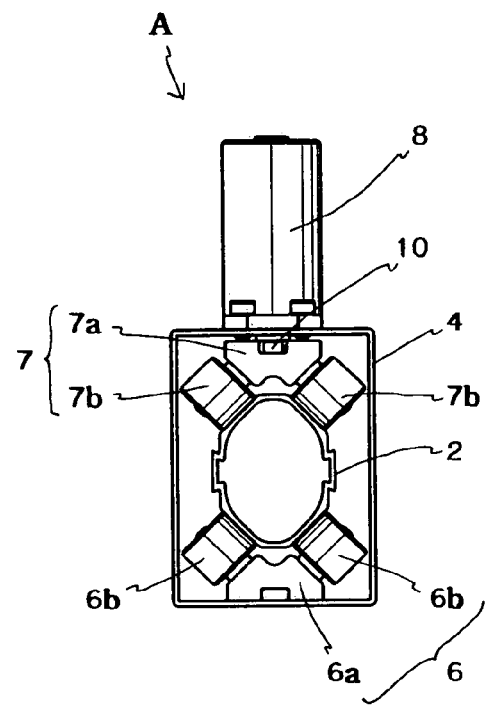
FIG. 3 is a side view of the linear motion drive system shown in FIG. 1.

FIG. 1 is a perspective view of a linear motion drive system of the present embodiment; FIG. 2 is a front view thereof; and FIG. 3 is a side view thereof.

The linear motion drive system "A" comprises: bases 1; a linear shaft 2, whose ends are respectively fixed to the bases 1, acting as a rail; a moving body 4 being guided by the linear shaft 2 and reciprocally moving on a linear track; roller units 6 and 7 contacting the linear shaft 2 as contact bodies; and pressure units 8 pressing the roller units 6 and 7 to the linear shaft 2 with a prescribed force so as to apply pressure to the linear shaft 2.

The linear shaft 2, which acts as a rail, is formed into a cylindrical shape and has a hexagonal shape in section. The linear shaft 2 is made of a light metal, e.g., aluminum alloy, and formed by, for example, extrusion. Since the linear shaft 2 has the hexagonal shape in section, an outer face of the linear shaft 2 is divided into six parts in the circumferential direction.

The moving body 4 is formed into a cylindrical shape and has a rectangular shape in section. The sectional area of the moving body 4 is broader than that of the linear shaft 2. The moving body 4 covers the linear shaft 2.

The roller unit 6 is provided on one of inner walls of the moving body 4. The roller unit 6 includes: a base section 6a being fixed to one of the inner wall of the moving body 4; rollers 6b being rotatably attached to the base section 6a and contacting the adjacent two parts of the outer face of the linear shaft 2. The rollers 6b respectively have ball bearings (not shown) so as to smoothly rotate.

The roller unit 7 and pressure units 8 are provided on a wall of the moving body 4, which is opposite to the wall on which the roller unit 6 is provided.

The pressure units 8 are fixed on the outer face of the wall. Opening sections are formed in the wall, on which the pressure units 8 are fixed, and press sections 10 (see FIG. 3) of the pressure units 8 are respectively inserted in the opening sections and inwardly projected from the wall.

The roller unit 7 includes: a base section 7a being fixed to the press sections 10 of the pressure units 8; rollers 7b being rotatably attached to the base section 7a and contacting the adjacent two parts of the outer face of the linear shaft 2. The two parts of the outer face of the linear shaft 2, on which the rollers 7b contact, are opposite to another two parts thereof, on which the rollers 6b contact. The rollers 7b respectively have ball bearings (not shown) so as to smoothly rotate.

With the pressure units 8 of the moving body 4, the press sections 10 press the linear shaft 2. The moving body 4 is guided by the roller units 6 and 7, which act as the contact bodies, and capable of linearly reciprocally moving along the linear shaft 2.

To self-propel the moving body 4, for example, a motor or motors, which rotate the rollers 6a and/or 7a, may be provided to the moving body 4.

Next, the pressure unit 8 will be explained.

Figure 4:
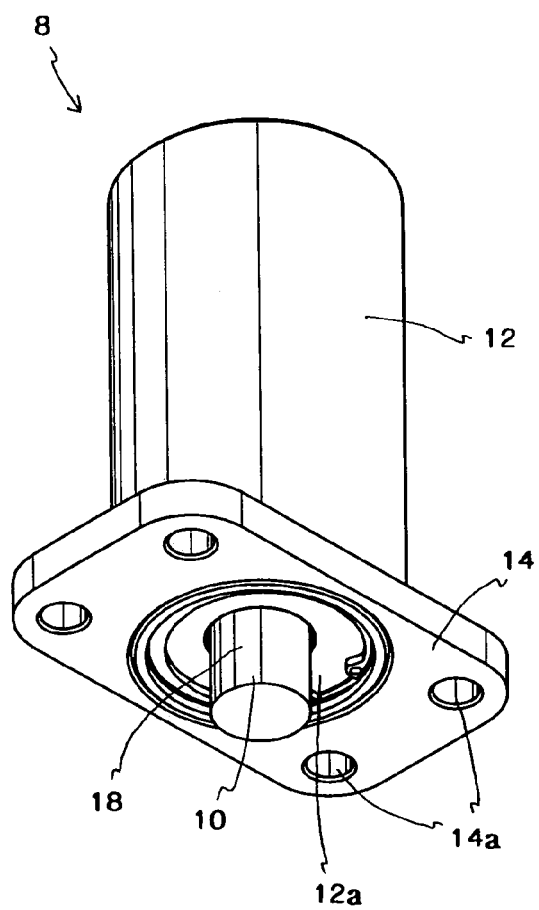
FIG. 4 is a perspective view of a pressure unit of the linear motion drive system.

FIG. 4 is a perspective view of the pressure unit 8, which is disassembled from the drive system "A".

The pressure unit 8 comprises: a circular cylinder 12; an attachment 14 having four holes 14a, into which screws are inserted so as to fix the pressure unit 8 to the moving body 4; and a piston rod 18, which retracts into and projects from the cylinder 12 and directly contacts the roller unit 7 as the press section 10.

Figure 5:
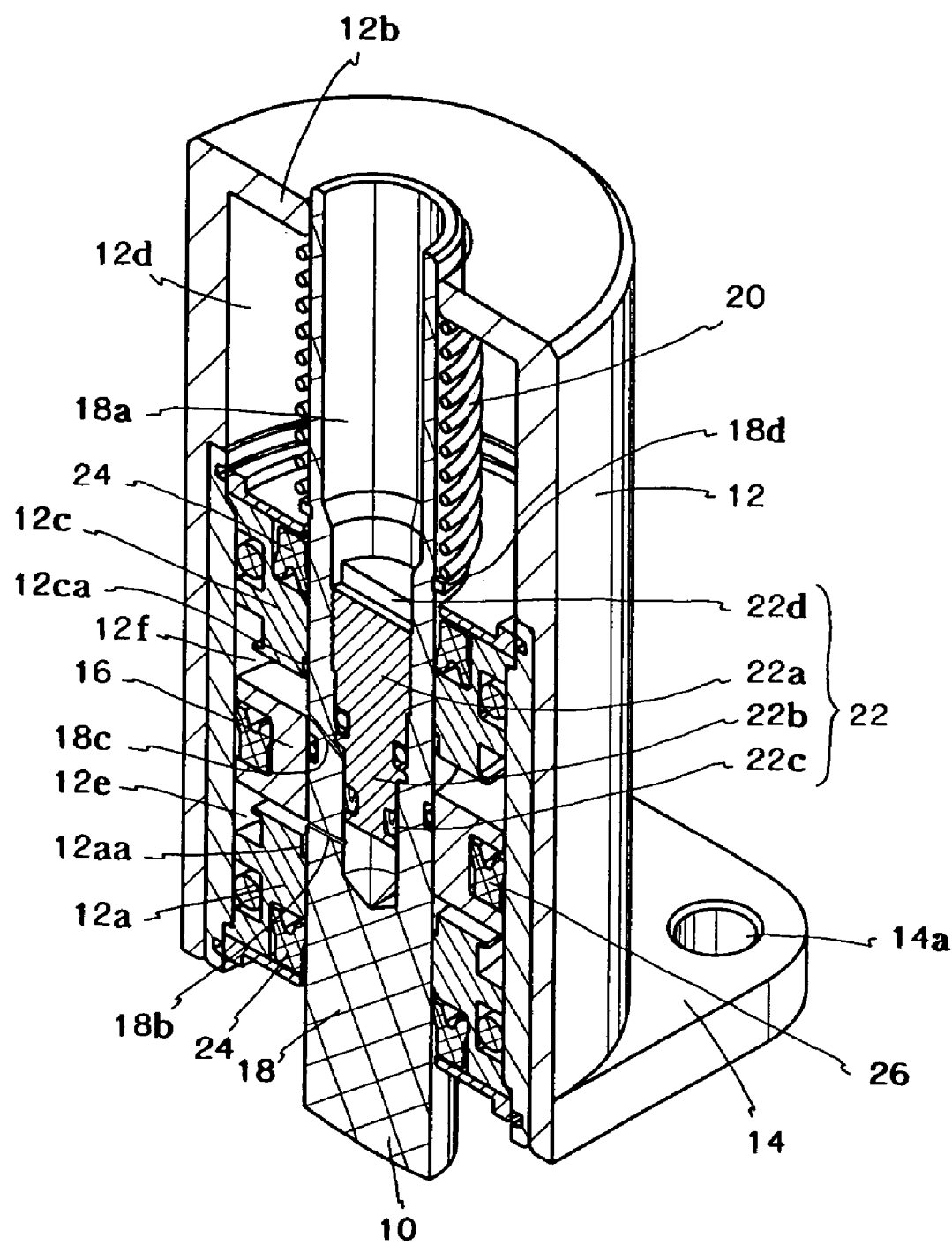
FIG. 5 is a perspective sectional view of the pressure unit shown in FIG. 4.

FIG. 5 is a perspective sectional view of the pressure unit 8.

The cylinder 12 includes: a wall 12a closing one end located on the roller unit 7 (the contact body) side; a wall 12b closing the other end; and a wall 12c dividing a space between the walls 12a and 12b.

A spring space 12d, in which a coil spring 20 biasing the piston rod 18 toward the linear shaft 2 is accommodated, is formed between the walls 12b and 12c of the cylinder 12. One end of the coil spring 20 contacts an inner face of the wall 12b, and the other end contacts a circular projected section 18d, which is formed on an outer circumferential face of the piston rod 18. With this structure, the piston rod 18 is biased toward the roller unit 7 or the linear shaft 2.

An oil chamber, which is filled with oil or a fluid, is formed between the walls 12a and 12c of the cylinder 12. The oil chamber is divided into two spaces by a piston 16, which is fixed to the piston rod 18 and radially outwardly projected there from. Namely, a first chamber 12e is formed on the roller unit 7 side of the piston 16; a second chamber 12f is formed on the opposite side thereof. The chambers 12e and 12f are formed on the both sides of the piston 16.

With this structure, capacity of the first chamber 12e is reduced with moving the piston rod 18 toward the roller unit 7 (projecting the piston rod 18 from the cylinder 12 so as to press the roller unit 7 onto the linear shaft 2) or moving the piston 16 toward the wall 12a. On the other hand, capacity of the second chamber 12f is increased with moving the piston rod 18 toward the roller unit 7 or moving the piston 16 away from the wall 12c.

The piston rod 18 is pierced through the cylinder 12, and one end, which is located on the roller unit 7 side, is outwardly projected from the cylinder 12. A hollow section 18a is formed in the piston rod 18 and opened at the other end. The piston rod 18 has a first hole 18b communicating the hollow section 18a with the first chamber 12e. In the first chamber 12e, the first hole 18b is opened at a position close to the piston 16. Further, the piston rod 18 has a second hole 18c communicating the hollow section 18a with the second chamber 12f. In the second chamber 12f, the second hole 18c is opened at a position close to the piston 16.

A interchamber path, which communicate the first chamber 12e with the second chamber 12f, is constituted by the hollow section 18a, the first hole 18b and the second hole 18c.

The pressure unit 8 has a closing member 22. The closing member 22 is detachably attached in the hollow section 18a. To attach the closing member 22, the closing member 22 is inserted into the hollow section 18a from the open end. The closing member 22 has: a closing section 22a, which is closes the hollow section 18a at a position on the open end side with respect to the first and second holes 18b and 18c; and an extended section 22b, which is extended from the closing section 22a to a position in the hollow section 18a and between the first hole and the second hole 18b and 18c. A ring-shaped check valve 22c is provided between an outer circumferential face of the closing member 22 and an inner circumferential face of the hollow section 18a.

A male screw section is formed in an outer circumferential face of the closing section 22a and screwed with a female screw section of the hollow section 18a. With this structure, the closing member 22 is held in the hollow section 18a and closes the hollow section 18a on the open end side with respect to the first and second holes 18b and 18c. The closing member 22 can be attached into and detached from the hollow section 18a by turning the closing member 22 with a screw driver. Note that, a groove 22d for engaging with the screw driver is formed at the end of the closing member 22.

A small clearance, through which the oil passes, is formed between an outer circumferential face of the extended section 22b and the inner circumferential face of the hollow section 18a, but the clearance is closed by the check valve 22c. The check valve 22c is made of a ring-shaped elastic material, whose section is formed into a Y-shape. A branched part of the Y-shape is set toward the first chamber 12e, so that the check valve 22c allows the oil to flow from the first chamber 12e to the second chamber 12f, but the check valve 22c prohibits the oil to flow from the second chamber 12f to the first chamber 12e. Note that, the first and second chambers 12e and 12f and the interchamber path are filled with the oil.

When the chambers 12e and 12f and the interchamber path are filled with the oil, the closing member 22 is detached from the hollow section 18a, and air is sucked from the open end of the piston rod 18. By sucking air, negative pressure is produced in the chambers 12e and 12f and the interchamber path, then the oil is drawn into the hollow section 18a by negative pressure, so that the chambers 12e and 12f and the interchamber path can be filled with the oil without mixing air.

Note that, in the state of detaching the closing member 22, the first hole 18b acts as a first communication path, which communicates the first chamber 12e with outside of the cylinder 12 via the hollow section 18a; the second hole 18c acts as a second communication path, which communicates the second chamber 12f with outside of the cylinder 12 via the hollow section 18a.

Ring-shaped check valves 24, which have Y-shaped sections, are respectively provided between the walls 12a and 12c and the outer circumferential face of the piston rod 18. Therefore, no oil leaks from the chambers 12e and 12f via the walls 12a and 12c.

Further, a ring-shaped check valve 26, which has a Y-shaped section, is provided between the piston 16 and the inner circumferential face of the cylinder 12. Therefore, no oil flows from the second chambers 12f to the first chamber 12e.

Figure 6:
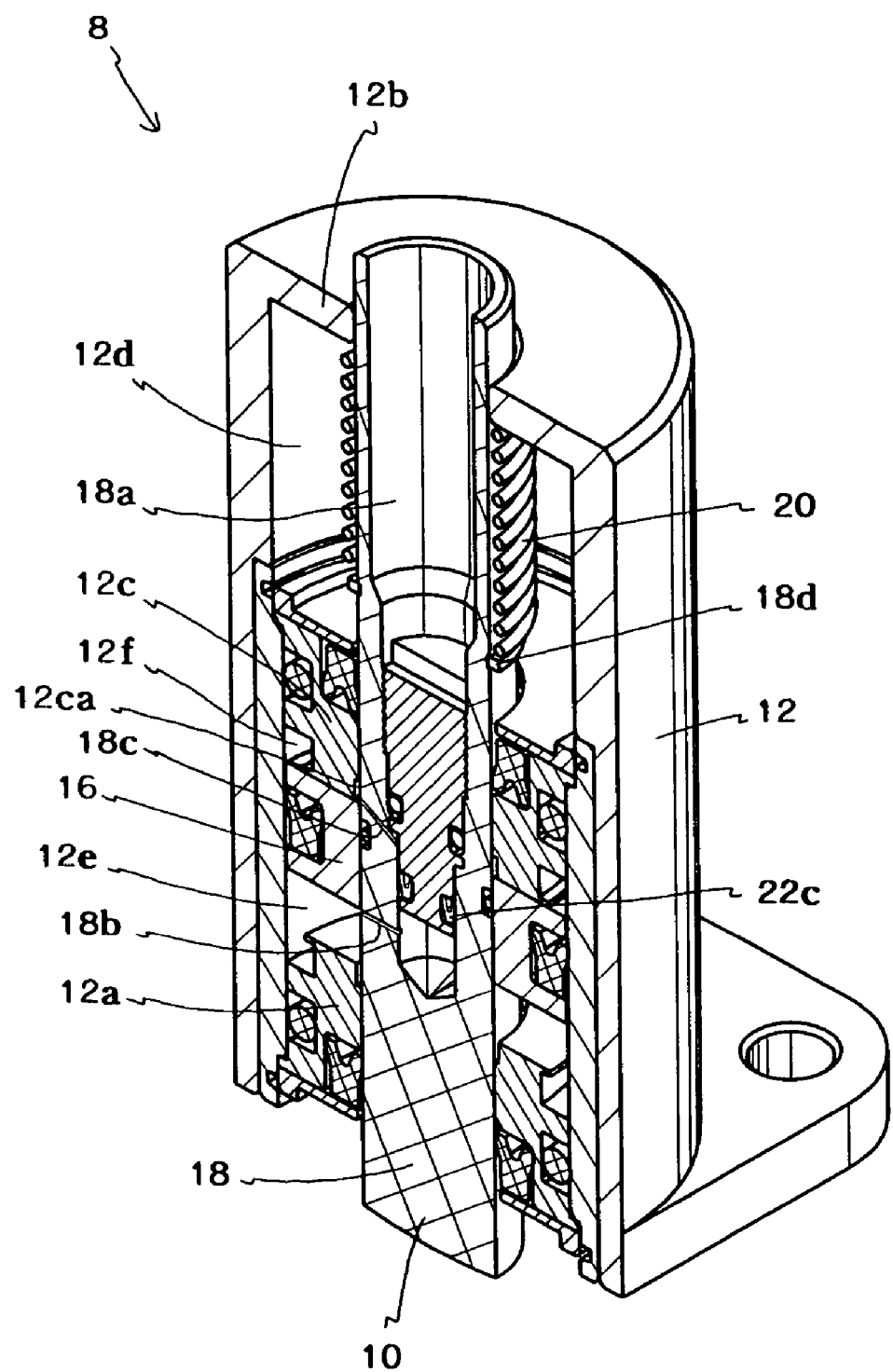
FIG. 6 is a perspective sectional view of the pressure unit in an initial state.

The pressure unit 8 before use is shown in FIG. 6. The piston rod 18 is at the inmost position with respect to the cylinder 12. Namely, this position is an initial position, at which a distance between the piston rod 18 and the linear shaft 2 is maximized. The piston 16 is close to the wall 12c, so that the capacity of the first chamber 12e is maximized; the capacity of the second chamber 12f is minimized. Note that, in this state, an outer end of the second hole 18c is opened in a oil path 12ca, which is formed in the wall 12c so as to introduce the oil into the second chamber 12f via the second hole 18c. Further, an oil path 12aa is formed in the wall 12a, so that an outer end of the first hole 18b is opened in the oil path 12aa even if the piston 16 contacts the wall 12a.

In the initial state, in which the piston rod 18 is retracted in the cylinder 12 (see FIG. 6), each of the pressure units 8 is attached to the moving body 4 by inserting screws into the screw holes 14a of the attachment 14. When the pressure units 8 are attached to the moving body 4, the piston rods 18 contact the base section 7a of the roller unit 7. Then, the coil springs 20 biases the piston rods 18 toward the roller unit 7, so that the rollers 7b are moved to the linear shaft 2. At that time, the piston 16 is moved toward the roller unit 7 or the linear shaft 2, so that the capacity of the first chamber 12e is reduced; the capacity of the second chamber 12f is increased. Therefore, the oil flows from the first chamber 12e to the second chamber 12f via the interchamber path. Then, the coil springs 20 press the rollers 7b onto the linear shaft 2, so that pressure can be applied from the moving body 4 to the linear shaft 2.

The pressure units 8 apply the pressure to the linear shaft 2. On the other hand, a counter force is reversely applied from the linear shaft 2 to the pressure units 8. However, the check valve 22c of each pressure unit 8 prohibits the oil to flow from the second chamber 12f to the first chamber 12e, so that the roller unit 7, the piston rod 18 and the piston 16 are not moved away from the linear shaft 2. Therefore, the pressure units 8 can oppose against the counter force. Namely, a locking mechanism of each pressure unit 8, which holds the piston rod 18 so as not to move away from the linear shaft 2, can be realized. In the present embodiment, the oil is used as the fluid, so volume of the oil in the chambers 12e and 12f is not varied by external forces. Therefore, the piston rods 18 can be securely locked at the pressing positions.

By the locking mechanisms, the piston rods 18 are not moved toward the coil springs 20 or away from the linear shaft 2, no clearance is formed between the roller unit 7 and the linear shaft 2 even if a great force is applied to the roller unit 7 and the piston rods 18. Therefore, the moving body 4 can be moved without looseness.

And, stress in the locking mechanisms can oppose against the force applied to the roller unit 7 and the piston rods 18 from the linear shaft 2, so the pressure applied by the coil springs 20 need not be great.

Even if the linear shaft 2 and/or the rollers 6b and 7b are abraded, the coil springs 20 move the roller unit 7 and the piston rods 18 toward the linear shaft 2 and the locking mechanisms prevent them from returning. Therefore, the clearance between the rollers 6b and 7b and the linear shaft 2 can be removed, so that the drive system "A" can be operated without looseness or play.

For maintenance, etc., the moving body 4 is disassembled from the linear shaft 2 or the pressure units 8 are detached from the moving body 4. Since the piston rods 18 are biased toward the roller unit 7 or biased to project from the cylinders 12 by the coil springs 20, the piston rods 18 are moved until the pistons 16 contact the walls 12a. And, the piston rods 18 are held at the contact positions by the locking mechanisms so as not to return to the initial positions (see FIG. 6).

To return the piston rod 18 of each pressure unit 8 to the initial position, the closing member 22 including the check valve 22c is detached so as to open the interchamber path. By removing the check valve 22c, the locking mechanism can release the piston rod 18, so that the piston rod 18 can be moved away from the linear shaft 2 and returned to the initial position. When the closing member 22 is detached, the first and second communication paths are communicated with outside of the cylinder 12. Therefore, the locking mechanism can release the piston rod 18.

After the piston rod 18 returns to the initial position, air is sucked from the chambers 12e and 12f and the interchamber path via the hollow section 18a of the piston rod 18, from which the closing member 22 has been removed. By sucking air, negative pressure is produced in the chambers 12e and 12f and the interchamber path, then the oil is drawn into the hollow section 18a by negative pressure, so that the chambers 12e and 12f and the interchamber path can be filled with the oil without mixing air. Then, the closing member 22 is attached in the hollow section 18a again so as to reuse the pressure unit 8.

Second Embodiment

A second embodiment will be explained. A feature of the second embodiment is the pressure unit. The pressure unit of the present embodiment may be attached to the linear motion drive system "A" of the first embodiment instead of the pressure units 8. Note that, structural elements explained in the first embodiment are assigned the same symbols and explanation will be omitted.

Figure 7:
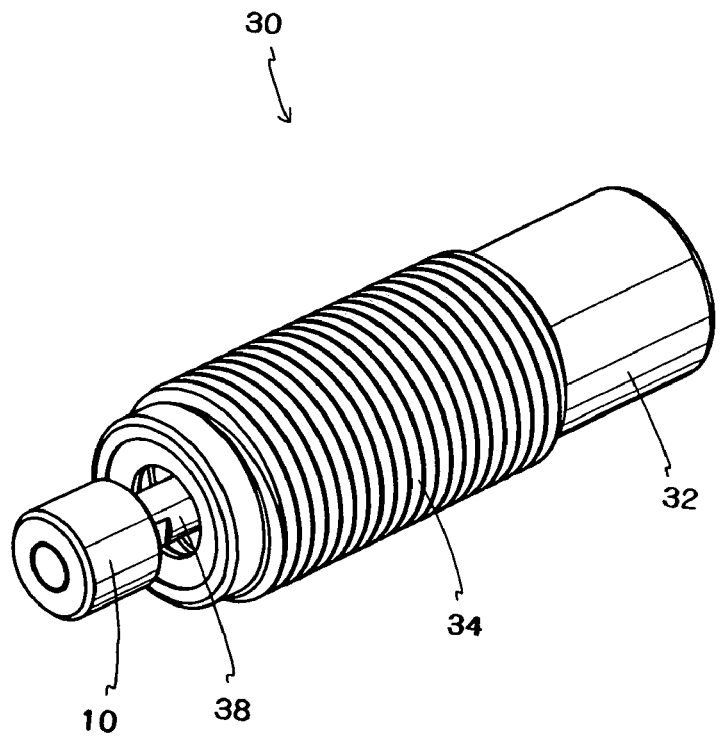
FIG. 7 is a perspective view of a pressure unit of a second embodiment.

The pressure unit of the present embodiment is shown in FIG. 7. FIG. 7 is a perspective view of the pressure unit 30.

The pressure unit 30 comprises: a circular cylinder 32; a male screw section 34 being formed in an outer circumferential face of the cylinder 32 so as to attached to the moving body 4; and a piston rod 38, which retracts into and projects from the cylinder 32 and whose one end directly contacts the roller unit 7 as the press section 10.

Figure 8:
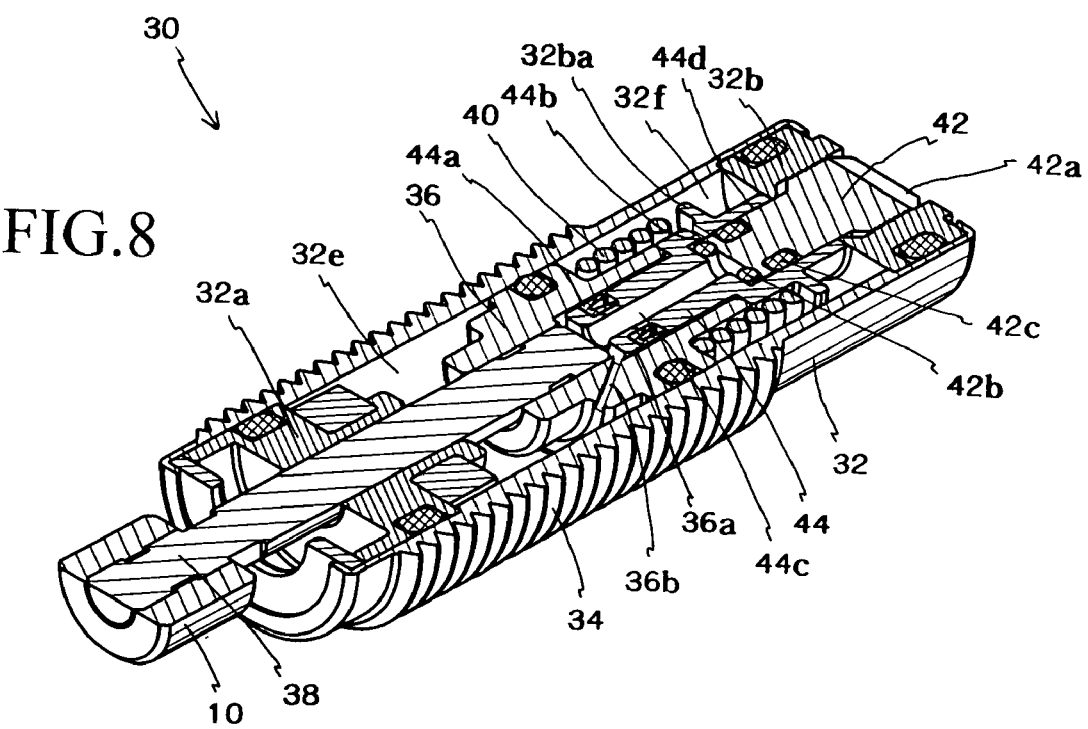
FIG. 8 is a perspective sectional view of the pressure unit shown in FIG. 7.

FIG. 8 is a perspective sectional view of the pressure unit 30.

One end of the cylinder 32, which is located on the roller unit 7 side, is closed by a wall 32a; the other end of the cylinder 32 is closed by a wall 32b.

An oil chamber, which is filled with oil, is formed between the walls 32a and 32b of the cylinder 32. The oil chamber is divided into two spaces by a piston 36, which is fixed to the piston rod 38 and radially outwardly projected there from. Namely, a first chamber 32e is formed on the roller unit 7 side of the piston 36; a second chamber 32f is formed on the opposite side thereof. The chambers 32e and 32f are formed on the both sides of the piston 36.

With this structure, capacity of the first chamber 32e is reduced with moving the piston rod 38 toward the roller unit 7 (projecting the piston rod 38 from the cylinder 32 so as to press the roller unit 7 onto the linear shaft 2) or moving the piston 36 toward the wall 32a. On the other hand, capacity of the second chamber 32f is increased with moving the piston rod 38 toward the roller unit 7 or moving the piston 36 away from the wall 32b.

A coil spring 40, which biases the piston 36 and piston rod 38 toward the linear shaft 2, is accommodated in the second chamber 32f of the cylinder 32. One end of the coil spring 40 contacts a circular projected section 32ba, which is formed on an outer circumferential face of a shaft member 44 of the wall 32b; the other end contacts the piston 36. With this structure, the piston 36 is biased toward the roller unit 7 or the linear shaft 2.

The piston 36 is fixed to the other end of the piston rod 38, which is the opposite end with respect to the one end at which the press section 10 is provided. A hollow section 36a is formed in the piston 36 and opened in an end face of the piston 36, which is located on the second chamber 32f side. Further, a third hole 36b, which communicates the hollow section 36a with the first chamber 32e, is formed in the piston 36.

The shaft member 44 is extended from a center of the wall 32b toward the piston 36 there from. The shaft member 44 is loosely fitted in the hollow section 36a.

In the present embodiment, the third hole 36b, the hollow section 36a and a clearance between an outer circumferential face of the shaft member 44 and an inner circumferential face of the hollow section 36a constitute the interchamber path.

A check valve 44a is provided between the outer circumferential face of the shaft member 44 and the inner circumferential face of the hollow section 36a. A clearance acts as an oil path is formed between the outer circumferential face of the shaft member 44 and the inner circumferential face of the hollow section 36a, but the clearance is closed by the check valve 44a. The check valve 44a is made of a ring-shaped elastic material, whose section is formed into a Y-shape. A branched part of the Y-shape is set toward the first chamber 32e, so that the check valve 44a allows the oil to flow from the first chamber 32e to the second chamber 32f, but the check valve 44a prohibits the oil to flow from the second chamber 32f to the first chamber 32e.

The shaft member 44 includes a small hollow section 44c, which communicates with the hollow section 36a, and a large hollow section 44d, which communicates with the small hollow section 44c, which is opened in an outer end face of the wall 32b and whose diameter is greater than that of the small hollow section 44c.

The third hole 36b, the hollow section 36a, the small hollow section 44c and the large hollow section 44d constitute the first communication path, which communicates the first chamber 32e with outside of the cylinder 32.

A fourth hole 44b, which communicates the second chamber 32f with the large hollow section 44d, is formed in the shaft member 44. The fourth hole 44b acts as the second communication path, which communicates the second chamber 32f with the outside of the cylinder 32.

A closing member 42 is detachably attached in the large hollow section 44d so as to close the small hollow section 44c and the fourth hole 44b.

The closing member 42 includes: a packing 42b, which contacts an edge of the small hollow section 44c from the large hollow section 44d side so as to tightly close a space between the small hollow section 44c and the large hollow section 44d; and a packing 42c, which contacts an outer circumferential face of the closing member 42 and an inner circumferential face of the large hollow section 44d at a position between the fourth hole 44b (the second communication path) and an outer end of the large hollow section 44d. By attaching the closing member 42, the first communication path and the second communication path are shut off from outside. A male screw section is formed on the outer circumferential face of the closing member 42, and a groove 42a for engaging with a screw driver is formed at an outer end thereof. By turning the closing member 42, the closing member 42 is screwed with a female screw section of the large hollow section 44d, so that the closing member 42 can be detachably attached in the large hollow section 44d.

The first and second chambers 32e and 32f and the interchamber path are filled with the oil.

When the chambers 32e and 32f and the interchamber path are filled with the oil, the closing member 42 is detached, and air is sucked from the open end of the shaft member 44 (the end of the large hollow section 44d). By sucking air, negative pressure is produced in the chambers 32e and 32f and the interchamber path, then the oil is drawn into the shaft member 44 by negative pressure, so that the chambers 32e and 32f and the interchamber path can be filled with the oil without mixing air.

In FIG. 8, the piston rod 38 is at the inmost position with respect to the cylinder 32. In this state, the pressure units 30 are attached to the moving body 4 of the linear motion drive system "A" by screw sections 34. Then, front ends of the piston rods 38 directly contact the base section 7a of the roller unit 7.

In the present embodiment, elasticity of the coil springs 40 of the pressure units 30 press the linear shaft 2 so as to apply pressure as well as the pressure unit 8 of the first embodiment. Further, even if a counter force works from the linear shaft 2 to the pressure units 30, the check valves 44a prohibits to flow the oil from the second chambers 32f to the first chambers 32e so that the piston rod 38 having the piston 36 and the roller unit 7 are not moved away from the linear shaft 2. Namely, the locking mechanism can be realized.

To return the piston rod 38 of each pressure unit 30 to the initial position, the closing member 42 is detached so as to communicate the first communication path, which is constituted by the third hole 36b, the hollow section 36a, the small hollow section 44c and the large hollow section 44d, and the second communication path, which is constituted by the fourth hole 44b, with outside of the cylinder 32. By removing closing member 42, the oil can freely flow into the chambers 32e and 32f so that the locking function performed by the check valve 44a can be released. Therefore, the piston rod 38 can be moved away from the roller unit 7 and returned to the initial position.

After the piston rod 38 returns to the initial position, air is sucked from the chambers 32e and 32f and the interchamber path via the open end of the shaft member 44. By sucking air, negative pressure is produced in the chambers 32e and 32f and the interchamber path, then the oil is drawn into the shaft member 44 by negative pressure, so that the chambers 32e and 32f and the interchamber path can be filled with the oil without mixing air. Then, the closing member 42 is attached again so as to reuse the pressure unit 30.

Third Embodiment

A third embodiment will be explained. A feature of the third embodiment is the pressure unit. The pressure unit of the present embodiment may be attached to the linear motion drive system "A" of the first embodiment instead of the pressure units 8. Note that, structural elements explained in the first embodiment are assigned the same symbols and explanation will be omitted.

Figure 9:
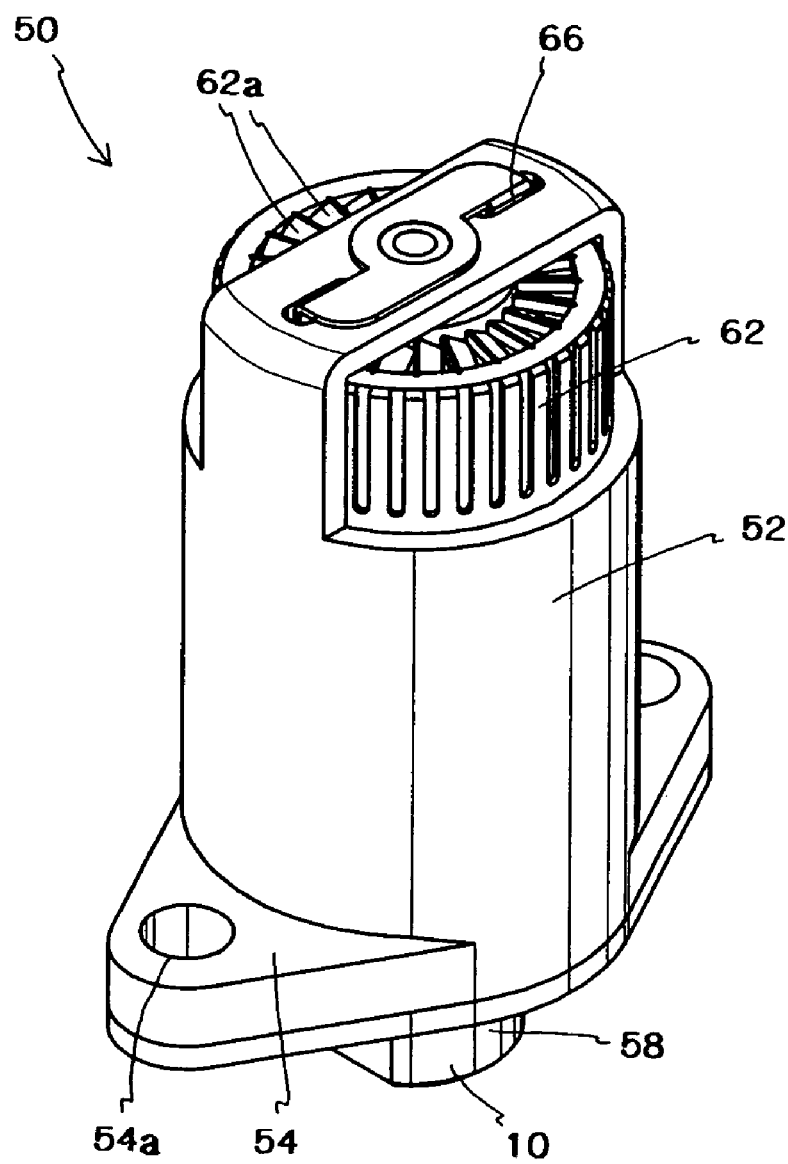
FIG. 9 is a perspective view of a pressure unit of a third embodiment.

The pressure unit of the present embodiment is shown in FIG. 9. FIG. 9 is a perspective view of the pressure unit 50.

The pressure unit 50 comprises: a casing 52 formed into a circular cylindrical shape; an attachment 54 having holes 54a, into which screws are inserted so as to fix the pressure unit 50 to the moving body 4; and a first screw member 58, whose front end retracts into a projects from the casing 52 and directly contacts the roller unit 7 as the press section.

Figure 10:
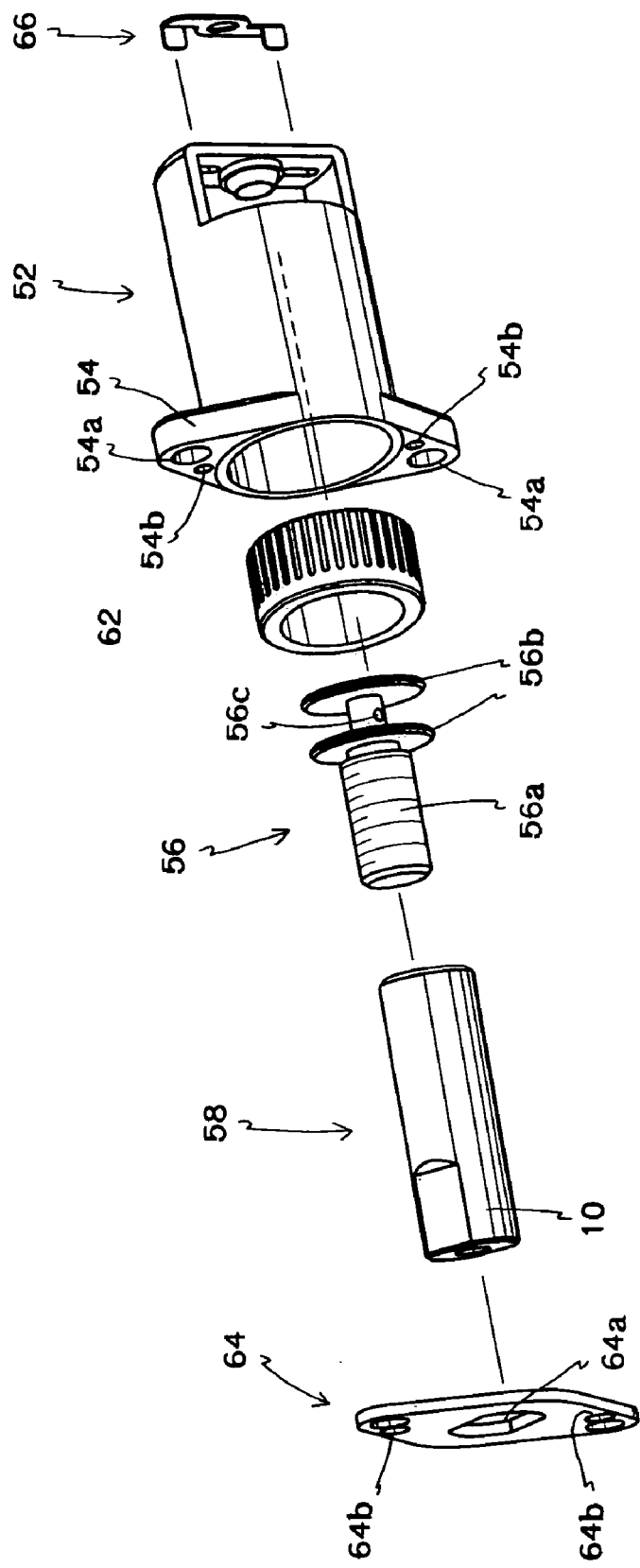
FIG. 10 is an exploded perspective view of the pressure unit shown in FIG. 9.
Figure 11:
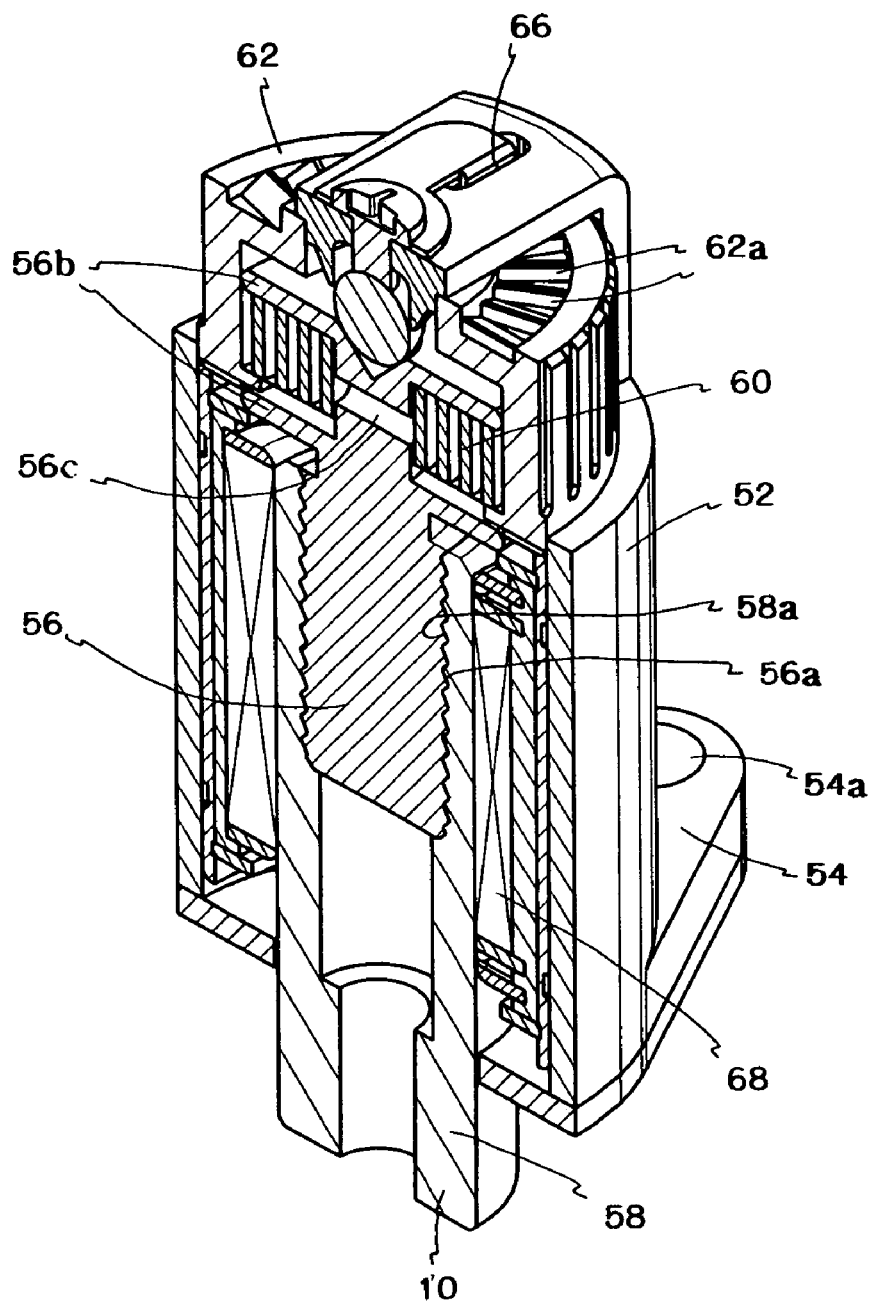
FIG. 11 is a perspective sectional view of the pressure unit shown in FIG. 9.

FIG. 10 is an exploded perspective view of the pressure unit 50, and FIG. 11 is a perspective sectional view thereof.

The first screw member 58 is capable of moving toward the roller unit 7, but is not capable of rotating with respect to the casing 52. One end of the first screw member 58 contacts the roller unit 7, and a female screw section 58a is formed in the other end part. The one end part of the first screw member 58 is formed into a noncircular shape as shown in FIG. 10 and pierced through a guide hole 64a of a guide member 64. A shape of the guide hole 64a corresponds to that of the one end part of the first screw member 58. Therefore, the first screw member 58 is capable of moving in the axial direction but not capable of rotating with respect to the casing 52. Note that, the guide member 64 is detachably attached to the attachment 54 of the casing 52 by screws, which will be inserted into holes 64b and screwed with female screw sections 54b.

As shown in FIG. 11, a ball bushing 68 (not shown in FIG. 10) is provided in the casing 52 to enclose the first screw member 58. A plurality of balls (not shown in FIG. 11) are provided in the ball bushing, and they contacts an outer circumferential face of the first screw member 58. With this structure, the first screw member 58 can smoothly move in the axial direction.

A second screw member 56, which has a male screw section 56a, is provided in the casing 52, and the male screw section 56a is screwed with the female screw section 58a of the first screw 58. The second screw member 56 is capable of rotating with respect to the casing 52 but not capable of moving toward the roller unit 7. With this structure, the second screw member 56 is capable of moving the first screw member 58 toward the roller unit 7.

The second screw member 56 has a pair of circular disk sections 56b, which are coaxially arranged with the male screw section 56a. A spiral spring 60, which acts as the biasing member, is held between the circular disk sections 56b. An inner end of the spiral spring 60 is fixed to a shaft section 56c, which connects the circular disk sections 56b.

A rotor 62 is coaxially arranged with the second screw member 56 and rotatable with respect to the casing 52. The rotor 62 encloses the circular disk sections 56b and the spiral spring 60. An outer end of the spiral spring 60 is fixed to an inner face of the rotor 62. The rotor 62 has a cylindrical shape, whose one end is closed. The other end of the rotor 62 is closed by a wall. A plurality of projected sections 62a are radially arranged in an outer face of the wall closing the rotor 62. Each projected section 62a has two faces. One face of each projected section 62a is a slope face, which is extended in one circumferential direction; the other face is a vertical face. A claw member 66, which is capable of engaging with the projected sections 62a, is fixed to the casing 52. Namely, the projected sections 62a and the claw member 66 constitute a ratchet mechanism, which allows the rotor 62 to rotate in the one circumferential direction only.

The pressure unit 50 before use is shown in FIG. 11. The first screw member 58 is at the inmost position with respect to the casing 52. Namely, this position is an initial position. In this state, the pressure units 50 are attached to the moving body 4 of the liner motion drive system "A" by inserting screws into the holes 54a of the attachment 54. The front ends of the first screw members 58 contact the base section 7a of the roller unit 7.

In each pressure unit 50, the spiral spring 60 biases the second screw member 56 to rotate, but the elasticity of the spiral spring 60 does not work to the second screw member 56 until a user rotates the rotor 62 in the prescribed direction so as to wind the spiral spring 60. If the first screw member 58 once projects from the casing 52 when the pressure unit 50 is attached to the moving body 4, the first screw member 58 cannot be return to the initial position so that the pressure unit 50 cannot be attached. By employing the spiral spring 60, the problem can be solved. In comparison with the pressure units 8 and 30 of the preceding embodiments, the pressure unit 50 can be treated easier.

When each pressure unit 50 is attached to the moving body 4, the rotor 62 is manually rotated so as to wind the spiral spring in the prescribed direction. By winding the spiral spring 60, the second screw member 56 is rotated in the prescribed direction by elasticity of the spiral spring 60. At that time, the screw sections 56a and 58a are mutually screwed, so that the first screw member 58 is moved toward the roller unit 7. When the rollers 7b contact the linear shaft 2, the first screw member 58 is stopped and the rotation of the second screw member 56 is also stopped. The spiral spring 60 still biases the second screw member 56. In this state, the first screw member 58 is biased toward the linear shaft 2 by elasticity of the spiral spring 60, so that the pressure can be applied from the moving body 4 to the linear shaft 4.

The elasticity of the spiral spring 60 can be adjusted by rotational angle of the rotor 62. Namely, the pressure working to the linear shaft 2 can be optionally adjusted by rotating the rotor 62.

Each of the pressure units 50 applies pressure to the linear shaft 2, but the first screw member 58 is not moved backward by the counter force from the linear shaft 2. Since the male screw section 56a of the second screw member 56 is screwed with the female screw section 58a of the first screw member 58, the counter force, which works to the screws members 56 and 58 in the axial direction thereof, generates no torque for rotating the second screw member 56. Therefore, the first screw member 58 is moved in the axial direction.

Namely, the screw sections 56a and 58b, which are mutually screwed, constitute the locking mechanism, which holds the first screw member 58 acting as the press section 10 so as not to move away from the linear shaft 2.

In the third embodiment, the first screw member 58 of each pressure unit 50, which acts as the press section 10, is held, by the locking mechanism constituted by the screw sections 56a and 58b, so as not to move away from the linear shaft 2. Namely, the spiral spring 60 is not loosened, so that no clearance is formed between the roller unit 7 and the linear shaft 2 even if a great force works to the roller unit 7 and/or the first screw member 58. Therefore, the moving body 4 can be linearly moved without looseness or play.

Stress in the locking mechanisms, which is constituted by the screw sections 56a and 58a of the screw members 56 and 58, can oppose against the the counter force from the linear shaft 2 to the roller unit 7 and the first screw member 58. Therefore, the pressure applied by the spiral springs 60 need not be great.

Even if the linear shaft 2 and/or the rollers 6b and 7b are abraded, the spiral springs 60 rotates the second screw member 56, so that the first screw member 58, which acts as the press section 10, and the roller unit 7 are moved toward the linear shaft 2. The locking mechanisms prevent them from returning. Therefore, the clearance between the rollers 6b and 7b and the linear shaft 2 can be removed, so that the drive system "A" can be operated without looseness or play.

Fourth Embodiment

A fourth embodiment will be explained.

Figure 12:
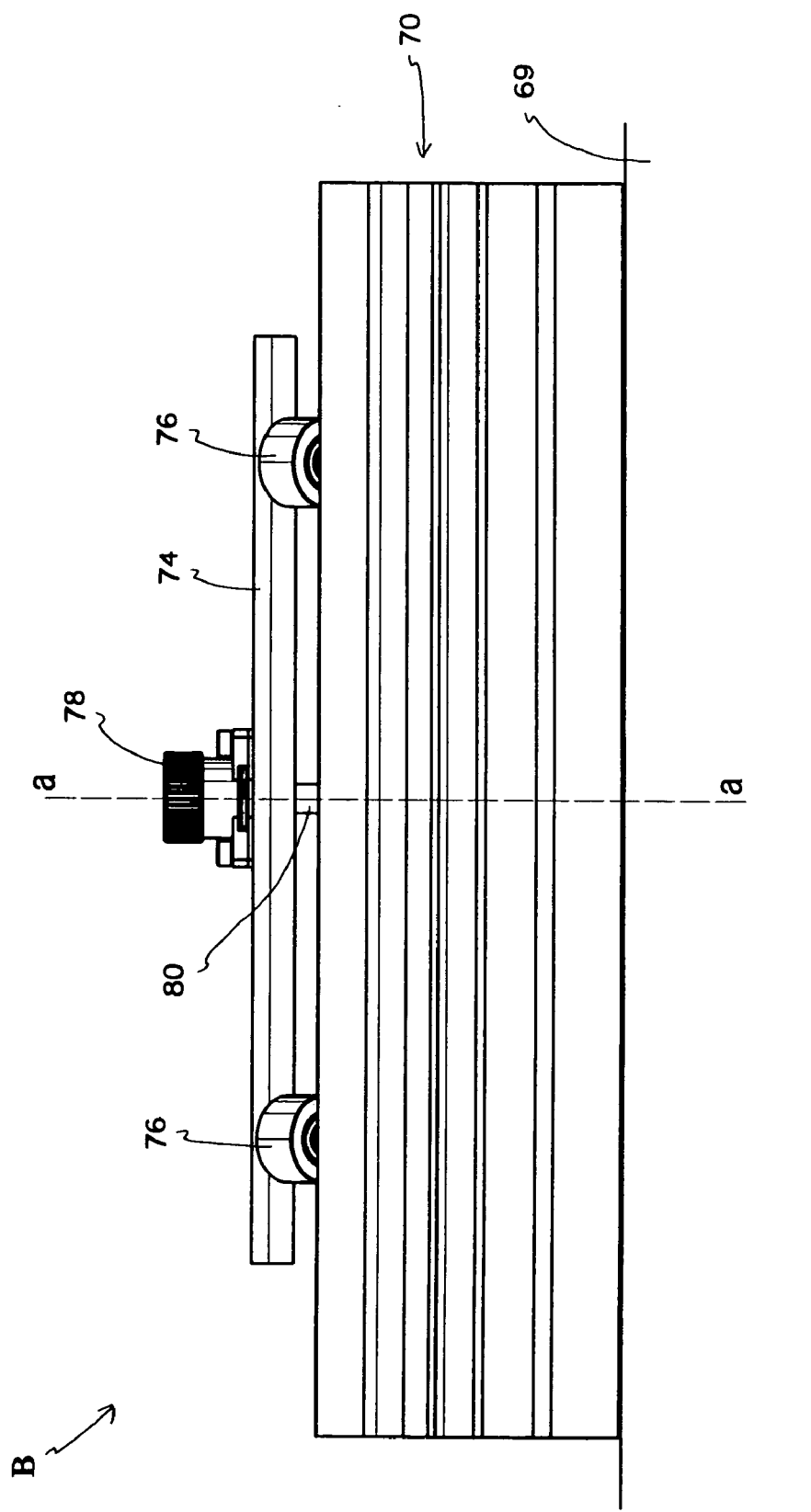
FIG. 12 is a front view of a fourth embodiment of the linear motion drive system.
Figure 13:
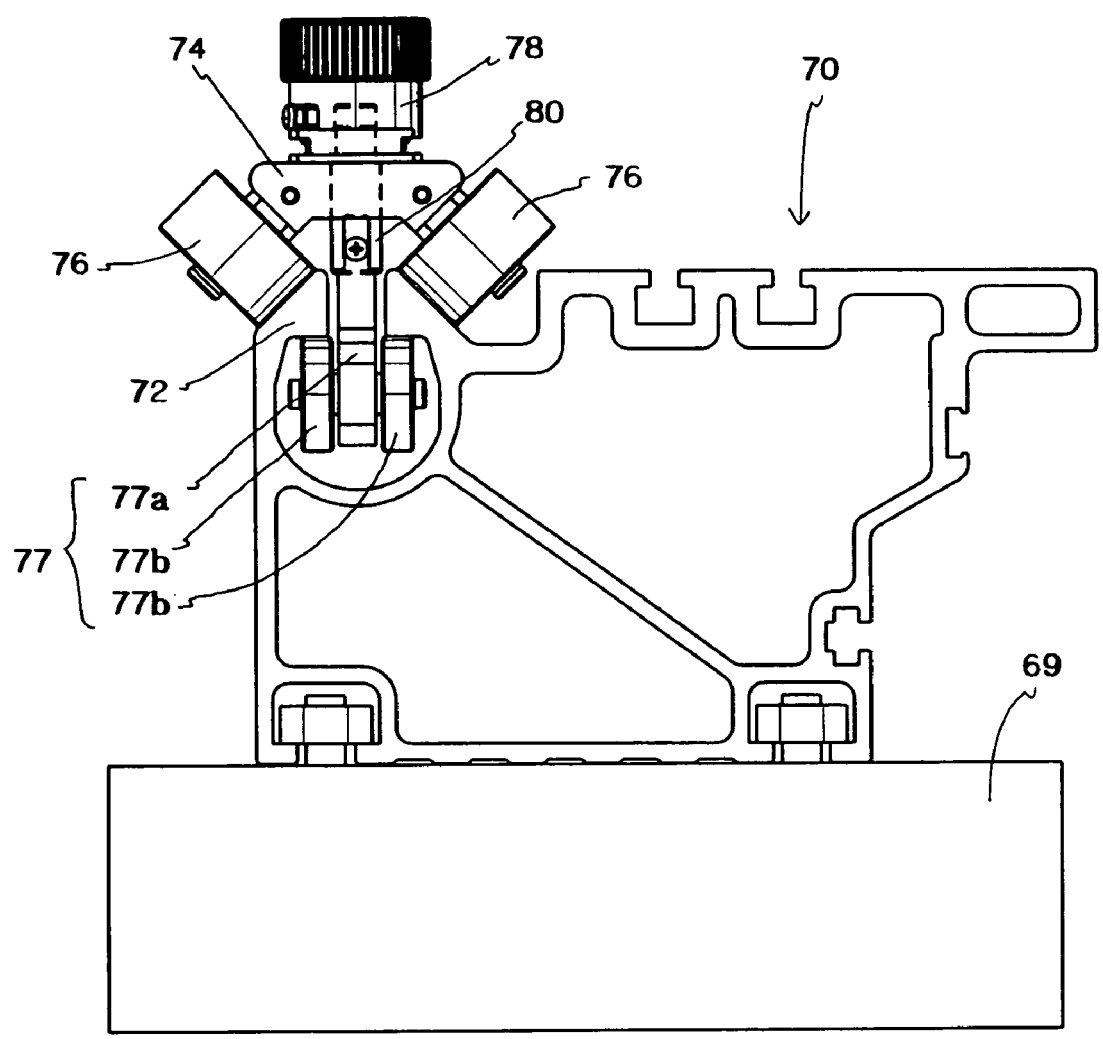
FIG. 13 is a side view of the linear motion drive system shown in FIG. 12.
Figure 14:
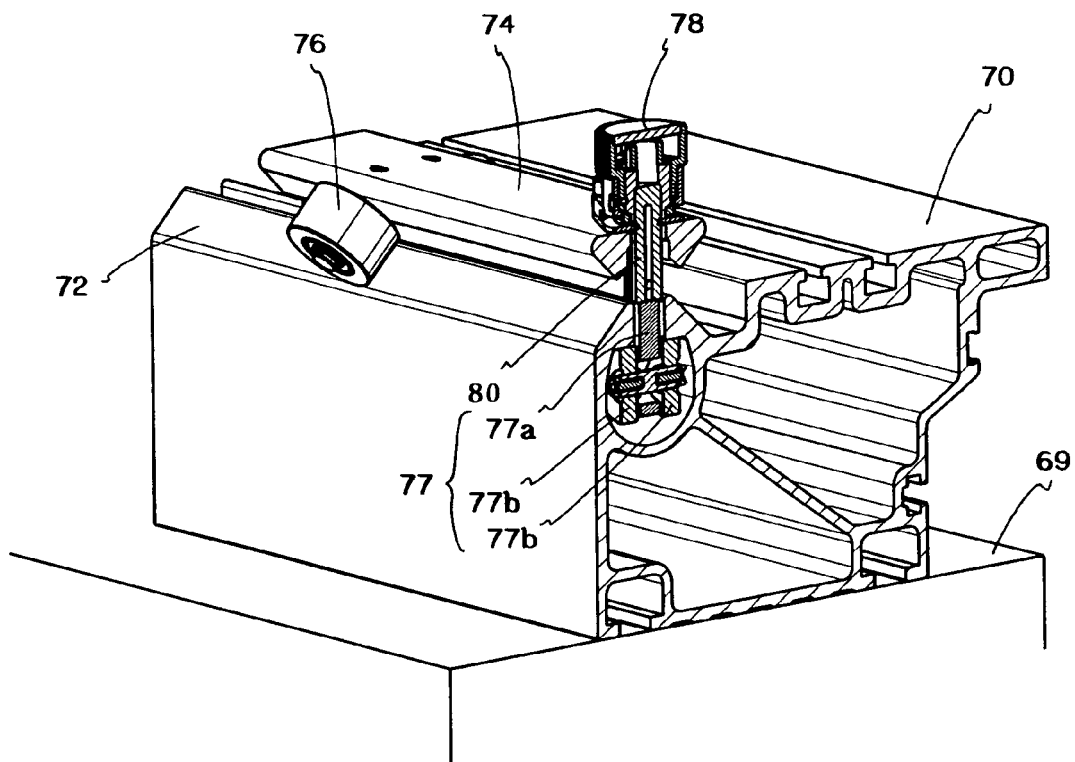
FIG. 14 is a perspective sectional view of the linear motion drive system shown in FIG. 12.

FIG. 12 is a front view of a linear motion drive system of the present embodiment; FIG. 13 is a side view thereof; and FIG. 14 is a perspective sectional view thereof.

The linear motion drive system "B" comprises: a base 69; a rail member 70 fixed to the base 69; a linear shaft 72, which acts as a rail; moving body 74 being guided by the linear shaft 72 and reciprocally moving on a linear track; roller units 76 and 77 contacting the linear shaft 72 as contact bodies; and a pressure unit 78, which is provided to the moving body 74 and which presses the roller units 77 to the linear shaft 72 with a prescribed force so as to apply pressure to the linear shaft 72.

The linear shaft 72, which acts as the rail, is formed into a C-shape in section and made of a light metal, e.g., aluminum alloy, and formed by, for example, extrusion. The linear shaft 72 may be integrated with the rail member 70.

The moving body 74 is a plate formed into a trapezoid in section. A narrow side of the trapezoid faces an opening part of the C-shape of the linear shaft 72, and the moving body 74 is arranged along the linear shaft 72.

Two pairs of the roller units 76 are attached to slope faces of the trapezoid of the moving body 74. Each pair of the roller units 76, which are arranged in the. longitudinal direction of the moving body 74, contact each outer edge of the opening part of the C-shape of the linear shaft 72. The roller units 76 respectively have ball bearings (not shown) so as to smoothly rotate.

A pressure unit 78 is fixed to a wide side of the trapezoid of the moving body 74. The pressure unit 78 is provided between the roller units 76, which are arranged in the longitudinal direction of the moving body 74.

A through-hole is bored from the wide side of the trapezoid of the moving body 74 to the narrow side thereof. A press section 80 of the pressure unit 78 is inserted in the linear shaft 72 via the through-hole and the opening part of the C-shape of the linear shaft 72.

The roller unit 77 includes: a base section 77a, which is fixed to a front end of the press section 80 by proper fixing means, e.g., screw; and a couple of rollers 77b, which are rotatably provided to the base section 77a and which respectively contact inner edges of the opening part of the C-shape of the linear shaft 72. The rollers 77b respectively have ball bearings (not shown) so as to smoothly rotate.

The pressure unit 78 draws the press section 80 toward a pressure unit proper by a biasing member so as to press the roller unit 77 onto the linear shaft 72 with prescribed force.

With the pressure units 78, the biasing member draws the press sections 80, so that proper pressure is applied from the moving body 74 to the linear shaft 72. In this state, the moving body 74 is guided by the roller units 76 and 77, which act as the contact bodies, and capable of linearly reciprocally moving along the linear shaft 72.

To self-propel the moving body 74, for example, a motor or motors, which rotate the roller units 76 and/or 77, may be provided to the moving body 74.

Next, the pressure unit 78 will be explained.

Figure 15:
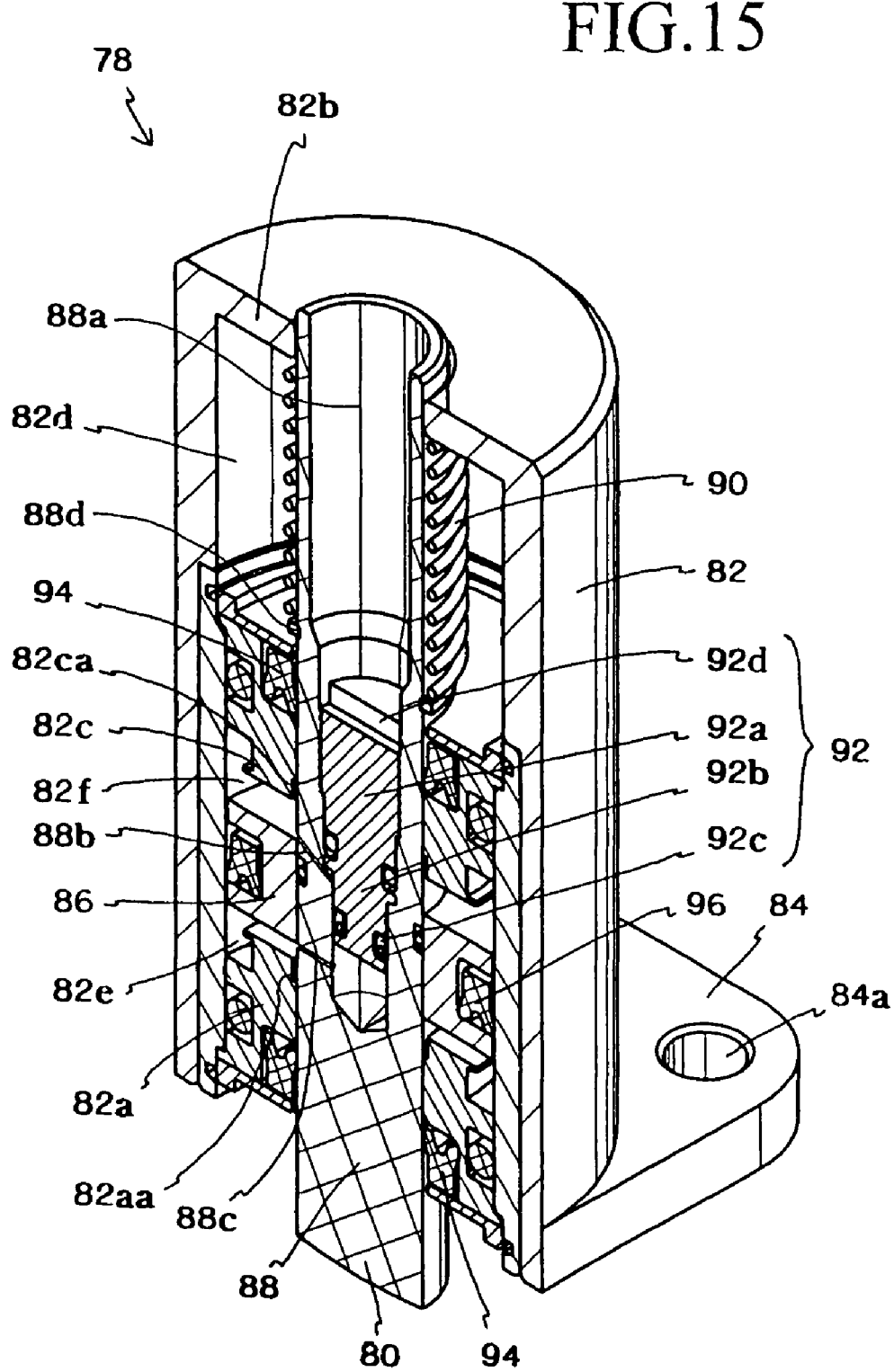
FIG. 15 is a perspective sectional view of a pressure unit.

FIG. 15 is a perspective view of the pressure unit 78, which is disassembled from the drive system "B".

In the pressure unit 78, a piston rod 88 having the press section 80 is biased to retract in a cylinder 82. The piston rod 88 is biased in the direction opposite the biasing direction of the pressure unit 8 of the first embodiment. An arrangement of a first chamber 82f and a second chamber 82e with respect to the roller unit 77 is opposite to that of the first embodiment. Therefore, the piston rod 88 is biased to retract into the cylinder 82; an outward movement of the piston rod 88 is prohibited.

The pressure unit 78 will be explained in detail.

The pressure unit 78 comprises: the circular cylinder 82; an attachment 84 having four holes 84a, into which screws are inserted so as to fix the pressure unit 78 to the moving body 74; and the piston rod 88, which has the press section 80 at the front end and which retracts into and projects from the cylinder 82. The roller unit 77 is fixed to the front end of the piston rod 88 projected from the cylinder 82. With this structure, the press section 80 is capable of moving the roller unit 77 to and away from the linear shaft 72.

The cylinder 82 includes: a wall 82a closing one end located on the roller unit 77 (the contact body) side; a wall 82b closing the other end; and a wall 82c dividing a space between the walls 82a and 82b.

A spring space 82d, in which a coil spring 90 is accommodated, is formed between the walls 82b and 82c of the cylinder 82. The coil spring 90 biases the piston rod 88 upward (in FIG. 15) so as to make the roller unit 77 press the linear shaft 72. One end of the coil spring 90 contacts an inner face of the wall 82c, and the other end contacts a circular projected section 88d, which is formed on an outer circumferential face of the piston rod 88. With this structure, the piston rod 88 is biased so as to make the roller unit 77 press the linear shaft 72.

An oil chamber, which is filled with oil or a fluid, is formed between the walls 82a and 82c of the cylinder 82. The oil chamber is divided into two spaces by a piston 86, which is fixed to the piston rod 88 and radially outwardly projected there from. Namely, the second chamber 82e is formed on the roller unit 77 side of the piston 86; the first chamber 82f is formed on the opposite side thereof. The chambers 82e and 82f are formed on the both sides of the piston 86.

With this structure, capacity of the first chamber 82f is reduced with moving the piston rod 88 to press the linear shaft 72 by the roller unit 77 (retracting the piston rod 88 into the cylinder 82 so as to press the roller unit 77 onto the linear shaft 72). On the other hand, capacity of the second chamber 82e is increased with moving the piston rod 88 to press the linear shaft 72 by the roller unit 77.

The piston rod 88 is pierced through the cylinder 82, and one end, which is located on the roller unit 77 side, is outwardly projected from the cylinder 82. A hollow section 88a is formed in the piston rod 88 and opened at the other end. The piston rod 88 has a first hole 88b communicating the hollow section 88a with the first chamber 82f. In the first chamber 82f, the first hole 88b is opened at a position close to the piston 86. Further, the piston rod 88 has a second hole 88c communicating the hollow section 88a with the second chamber 82e. In the second chamber 82e, the second hole 88c is opened at a position close to the piston 86.

A interchamber path, which communicate the first chamber 82f with the second chamber 82e, is constituted by the hollow section 88a, the first hole 88b and the second hole 88c.

The pressure unit 78 has a closing member 92. The closing member 92 is detachably attached in the hollow section 88a. To attach the closing member 92, the closing member 92 is inserted into the hollow section 88a from the open end. The closing member 92 has: a closing section 92a, which is closes the hollow section 88a at a position on the open end side with respect to the first and second holes 88b and 88c; and an extended section 92b, which is extended from the closing section 92a to a position in the hollow section 88a and between the first hole and the second hole 88b and 88c. A ring-shaped check valve 92c is provided between an outer circumferential face of the closing member 92 and an inner circumferential face of the hollow section 88a.

A male screw section is formed in an outer circumferential face of the closing section 92a and screwed with a female screw section of the hollow section 88a. With this structure, the closing member 92 is held in the hollow section 88a and closes the hollow section 88a on the open end side with respect to the first and second holes 88b and 88c. The closing member 92 can be attached into and detached from the hollow section 88a by turning the closing member 92 with a screw driver. Note that, a groove 92d for engaging with the screw driver is formed at the end of the closing member 92.

A small clearance, through which the oil passes, is formed between an outer circumferential face of the extended section 92b and the inner circumferential face of the hollow section 88a, but the clearance is closed by the check valve 92c. The check valve 92c is made of a ring-shaped elastic material, whose section is formed into a Y-shape. A branched part of the Y-shape is set toward the second chamber 82e, so that the check valve 22c allows the oil to flow from the second chamber 82e to the first chamber 82f, but the check valve 22c prohibits the oil to flow from the first chamber 82f to the second chamber 82e. Note that, the first and second chambers 82e and 82f and the interchamber path are filled with the oil.

When the chambers 82e and 82f and the interchamber path are filled with the oil, the closing member 92 is detached from the hollow section 88a, and air is sucked from the open end of the piston rod 88. By sucking air, negative pressure is produced in the chambers 82e and 82f and the interchamber path, then the oil is drawn into the hollow section 88a by negative pressure, so that the chambers 82e and 82f and the interchamber path can be filled with the oil without mixing air.

Note that, in the state of detaching the closing member 92, the first hole 88b acts as a first communication path, which communicates the first chamber 82f with outside of the cylinder 82 via the hollow section 88a; the second hole 88c acts as a second communication path, which communicates the second chamber 82e with outside of the cylinder 82 via the hollow section 88a.

Ring-shaped check valves 94, which have Y-shaped sections, are respectively provided between the walls 82a and 82c and the outer circumferential face of the piston rod 88. Therefore, no oil leaks from the chambers 82e and 82f via the walls 82a and 82c.

Further, a ring-shaped check valve 96, which has a Y-shaped section, is provided between the piston 86 and the inner circumferential face of the cylinder 82. Therefore, no oil flows from the second chambers 82e to the first chamber 82f.

Before using the pressure unit 78, the piston rod 88 is at the outermost position with respect to the cylinder 82. Namely, this position is an initial position, at which a distance between the roller unit 77 and the linear shaft 72 is maximized. The piston 86 is close to the wall 82a, so that the capacity of the first chamber 82f is maximized; the capacity of the second chamber 82e is minimized. Note that, in this state, an outer end of the second hole 88c is opened in a oil path 82a, which is formed in the wall 82a so as to introduce the oil into the second chamber 82e via the second hole 88c. Further, an oil path 82ca is formed in the wall 82c, so that an outer end of the first hole 88b is opened in the oil path 82ca even if the piston 86 contacts the wall 82c.

In the initial state, in which the piston rod 88 is maximally extended from the cylinder 82, the pressure units 78 is attached to the moving body 74 by inserting screws into the screw holes 84a of the attachment 84. When the pressure unit 78 is attached to the moving body 74, the piston rods 88 is connected to the base section 77a of the roller unit 77. Then, the coil spring 90 biases the piston rod 88 inward, so that the rollers 77b are moved to the linear shaft 72. At that time, the piston 86 is moved toward the roller unit 77 or the linear shaft 72, so that the capacity of the first chamber 82f is reduced; the capacity of the second chamber 82e is increased. Therefore, the oil flows from the first chamber 82f to the second chamber 82e via the interchamber path. Then, the coil spring 90 presses the rollers 77b onto the linear shaft 72, 50 that pressure can be applied from the moving body 74 to the linear shaft 72.

The pressure unit 78 applies the pressure to the linear shaft 72. On the other hand, a counter force is reversely applied from the linear shaft 72 to the pressure unit 78. However, the check valve 92c of the pressure unit 78 prohibits the oil to flow from the second chamber 82e to the first chamber 82f, so that the roller unit 77 is not moved away from the linear shaft 72. Therefore, the pressure units 78 can oppose against the counter force. Namely, the locking mechanism of the pressure unit 78, which holds the piston rod 88 so as not to move away from the linear shaft 72, can be realized. Therefore, the piston rod 88 can be securely locked at the pressing position.

Function and effects of the pressure unit 78 are same to those of the pressure unit 8 of the first embodiment.

Fifth Embodiment

Figure 16:
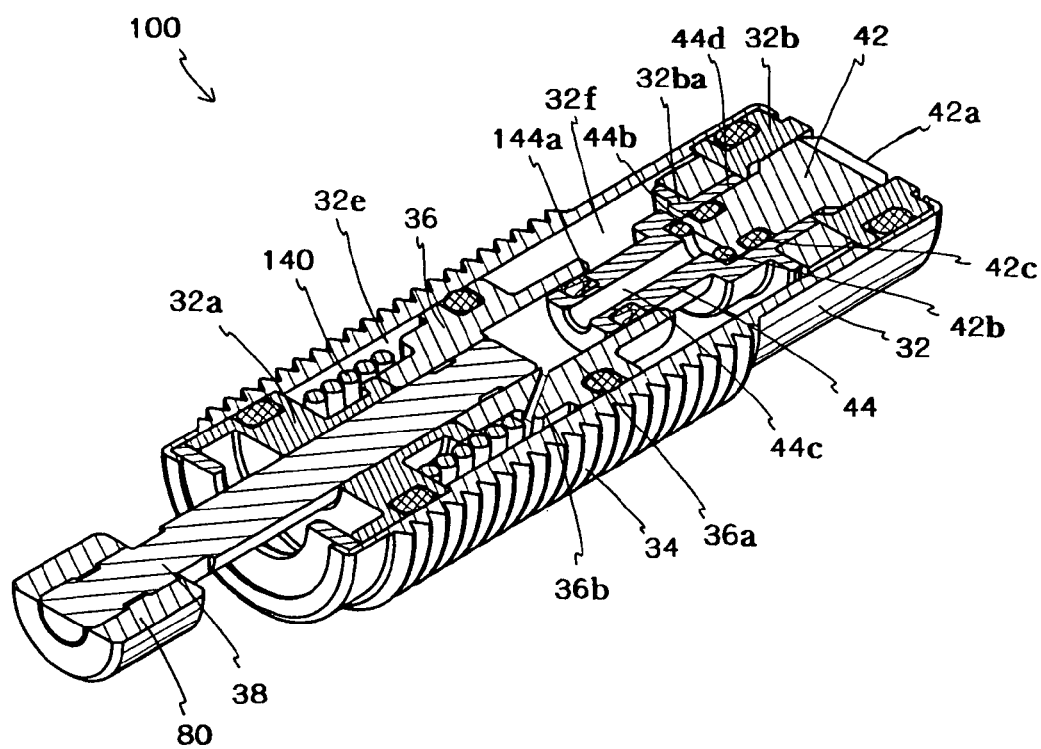
FIG. 16 is a perspective view of a pressure unit of a fifth embodiment.

A fifth embodiment will be explained. A feature of the fifth embodiment is the pressure unit. The pressure unit of the present embodiment may be attached to the linear motion drive system "B" of the fourth embodiment instead of the pressure units 78. Note that, structural elements explained in the fourth embodiment are assigned the same symbols and explanation will be omitted. The pressure unit of the present embodiment is shown in FIG. 16. FIG. 16 is a perspective sectional view of the pressure unit 100. Note that, the structure of the pressure unit 100 is almost the same as that of the pressure unit 30 of the second embodiment, so elements explained in the second embodiment are assigned the same symbols and explanation will be omitted.

Features of the pressure unit 100 of the present embodiment with respect to the pressure unit 30 of the second embodiment are an arrangement of a coil spring 140 and a direction of a check valve 144*a*.

The coil spring 140 is accommodated in the chamber 32*e* of the cylinder 32, which is located on the roller unit 77 side (on the press section 80 side). One end of the coil spring 100 contacts the wall 32*a* on the roller unit 77 side; the other end contacts the piston 36. With this structure, the piston 36 is biased toward the closing member 42.

Unlike the pressure unit 30 of the second embodiment, the check valve 144*a* allows the oil to flow from the chamber 32*f* to the chamber 32*e*, but the check valve 144*a* prohibits the oil to flow from the chamber 32*e* to the chamber 32*f*.

In the present embodiment, the piston rod 88 having the press section 80 is biased to retract into the cylinder 32, so that the roller unit 77 is pressed onto the linear shaft 72. Therefore, the pressure can be applied to the linear shaft 72. Unlike the pressure unit 30 of the second embodiment, the chamber 32*f* acts as the first chamber, and the chamber 32*e* acts as the second chamber. The movement of the piston rod 38 projecting from the cylinder 32 (the movement of the roller unit 77 moving away from the linear shaft 72) is prohibited. Namely, the locking mechanism can be realized.

Function and effects of the pressure unit 100 are same to those of the pressure unit 78 of the fourth embodiment.

Sixth Embodiment

A sixth embodiment will be explained. A feature of the fifth embodiment is the pressure unit. The pressure unit of the present embodiment may be attached to the linear motion drive system "B" of the fourth embodiment instead of the pressure units 78.

The pressure unit of the sixth embodiment is similar to the pressure unit 50 of the third embodiment (see FIGS. 9–11), so the present embodiment will be explained with reference to FIGS. 9–15.

In the present embodiment, the screw sections 56*a* and 58*a* of the screw members 56 and 58 are rotated in the opposite directions with respect to those of the third embodiment.

Unlike the pressure unit 50 of the third embodiment, when the second screw member 56 is rotated in the prescribed direction by elasticity of the spiral spring 60, the first screw member 58 is retracted into the casing 52 of the pressure unit by the screw sections 56*a* and 58*a*.

Since the first screw member 58, which acts as the press section, is biased toward the casing 52 of the pressure unit, the roller unit 77 can be pressed onto the linear shaft 72, so that the pressure can be applied to the linear shaft 72.

Further, the locking mechanism, which holds the roller unit 77 (the contact body) so as not to move away from the linear shaft 72, is constituted by the screw sections 56*a* and 58*a*.

Seventh Embodiment

Figure 17:
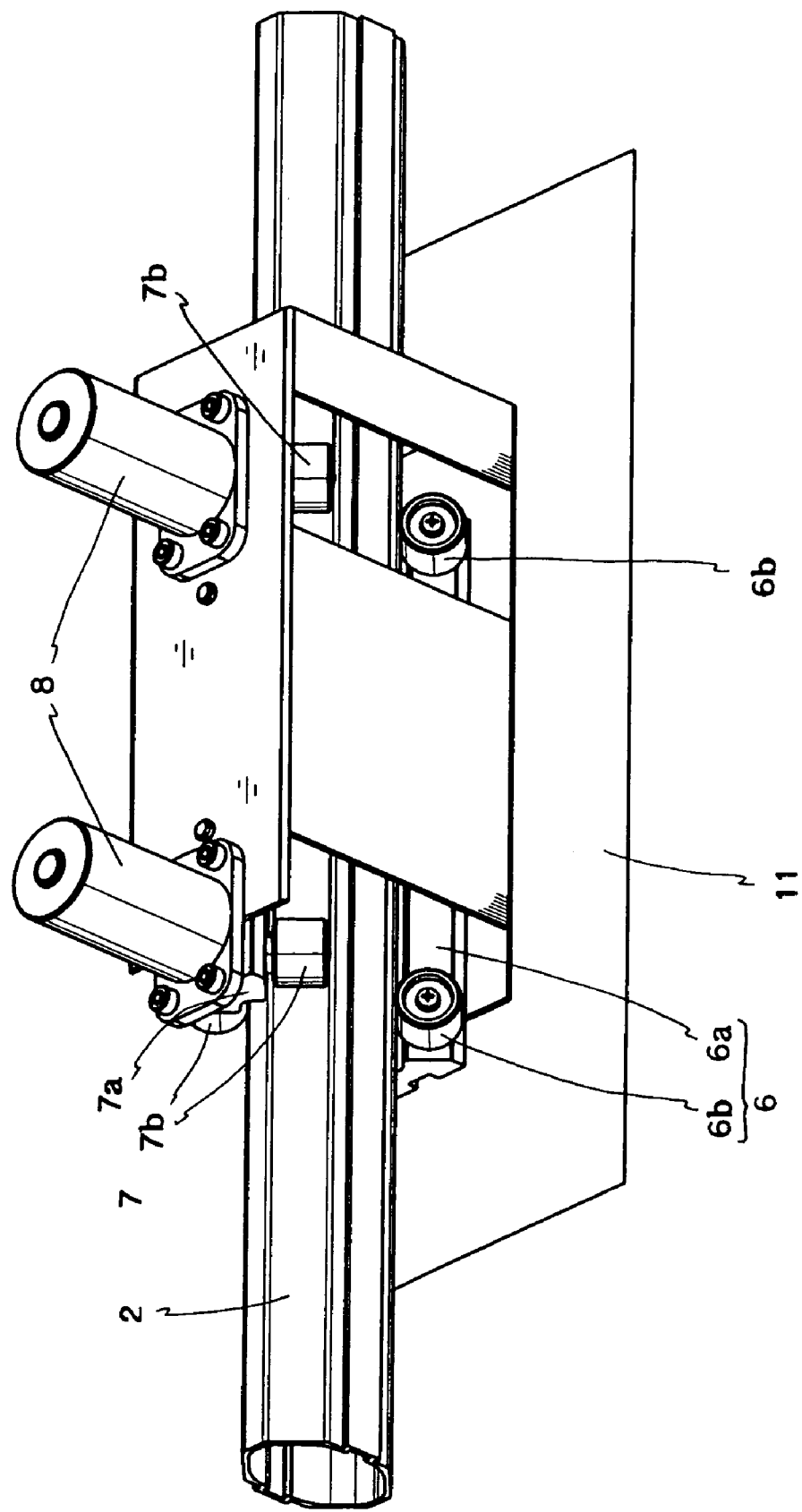
FIG. 17 is a perspective view of a seventh embodiment of the linear motion drive system, in which a linear shaft linearly moves.

In the first to sixth embodiments, the moving bodies 4 and 74 linearly move along the linear shafts 2 and 72. On the other hand, in the present embodiment, the linear shaft 2 linearly moves along the roller units 6 and 7 (see FIG. 17). Namely, the linear motion drive system of the present embodiment comprises: guide means 6 and 7, e.g., roller units, provided to a base member 11; pressure units 8 provided to the base member 11; and the linear shaft 2 capable of linearly moving along the guide means 6 and 7. In this case too, the pressure units 8 apply pressure from the base member 11 to the linear shaft 2, and the pressure units 8 described in the preceding embodiments can be employed.

In the first to seventh embodiments, the piston rods 18, 38 and 88 and the first screw member 58, which include or act as the press section 10 and 80, directly contact the roller unit 7 and 77, which act as the contact bodies.

In the above described embodiments, the moving bodies 4 and 74 linearly move along the linear shafts 2 and 72. Further, the linear motion drive system of the present invention may comprise: guide means, e.g., roller unit, provided to a base member; a pressure unit provided to the base member; and a linear shaft capable of linearly moving along the guide means. In this case too, the pressure unit applies pressure from the base member to the linear shaft, and the pressure unit described in each of the embodiments can be employed.

In the above described embodiments, the piston rods 18, 38 and 88 and the first screw member 58, which include or act as the press section 10 and 80, directly contact the roller unit 7 and 77, which act as the contact bodies. However, the present invention is not limited to the above described structures. For example, a transmission member may be provided between the press section and the contact body. Namely, the press section may press the contact body indirectly.

The linear motion drive system of the present invention can be light, and its manufacturing cost can be reduced. No clearance is formed between the contact body and the linear shaft even if a great force is applied to the contact body and the press section. Therefore, the linear motion drive system can be operated without looseness or play. Further, stress in the locking mechanism opposes against the force applied to the press section from the linear shaft, so the pressure applied by the biasing member need not be great. Even if the contact body and/or the linear shaft is abraded, the clearance between them can be automatically removed, so that the drive system can be operated without looseness or play.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A linear motion drive system, comprising:
   a base;
   a linear shaft being fixed to said base;

a moving body being linearly and reciprocally moved along said linear shaft;

a contact body contacting said linear shaft; and a pressure unit being provided to said moving body, said pressure unit pressing said contact body so as to apply pressure to said linear shaft, wherein said pressure unit includes:

a press section contacting and pressing said contact body toward said linear shaft;

a biasing member biasing the press section toward said linear shaft; and a locking mechanism holding the press section so as not to move away from said linear shaft, and wherein the press section includes:

a first screw member being capable of moving toward said contact body but being prohibited to rotate, the first screw member having one end, which directly or indirectly contacts said contact body, and the other end, in which a screw section is formed; and a second screw member having a screw section screwed with the screw section of the first screw member, the second screw member moving the first screw member toward said contact body when the second screw member is rotated in a prescribed direction, wherein said biasing member is a spiral spring, whose one end is fixed to said pressure unit and whose the other end is fixed to the second screw member, the spiral spring biasing the second screw member in a prescribed rotational direction, and wherein said locking mechanism is constituted by the screw sections of the first and second screw members.

2. The linear motion drive system according to claim 1, wherein said pressure unit further includes:

a rotor being coaxial with the second screw member, the rotor being rotatably provided to a casing of the pressure unit; and a ratchet mechanism allowing the rotor to rotate in a prescribed direction but prohibiting to rotate in the reverse direction, and wherein the one end of the spiral spring is fixed to the rotor, the spiral spring is wound by rotating the rotor in the prescribed direction so that the spiral spring is capable of biasing the second screw member in the prescribed direction.

3. The linear motion drive system according to claim 1, wherein a detachable guide member guides the first screw member toward said contact body but prohibits the same to rotate with respect to a casing of the pressure unit, and wherein the first screw member can be manually rotated when the guide member is detached.

4. The linear motion drive system according to claim 1, wherein said contact body is a roller unit.

5. A linear motion drive system, comprising:

a base;

a guide section being provided to said base;

a linear shaft being linearly and reciprocally moved along said guide section;

a contact body contacting said linear shaft; and a pressure unit being provided to said base, said pressure unit pressing said contact body so as to apply pressure to said linear shaft, wherein said pressure unit includes:

a press section contacting and pressing said contact body toward said linear shaft;

a biasing member biasing the press section toward said linear shaft; and a locking mechanism holding the press section so as not to move away from said linear shafts, wherein the press section includes:

a first screw member being capable of moving toward said contact body but being prohibited to rotate, the first screw member having one end, which directly or indirectly contacts said contact body, and the other end, in which a screw section is formed; and a second screw member having a screw section screwed with the screw section of the first screw member, the second screw member moving the first screw member toward said contact body when the second screw member is rotated in a prescribed direction, wherein said biasing member is a spiral spring, whose one end is fixed to said pressure unit and whose the other end is fixed to the second screw member, the spiral spring biasing the second screw member in a prescribed rotational direction, and wherein said locking mechanism is constituted by the screw sections of the first and second screw members.

6. The linear motion drive system according to claim 5, wherein said contact body is a roller unit.

7. The linear motion drive system according to claim 5, wherein said pressure unit further includes:

a rotor being coaxial with the second screw member, the rotor being rotatably provided to a casing of the pressure unit; and a ratchet mechanism allowing the rotor to rotate in a prescribed direction but prohibiting to rotate in the reverse direction, and wherein the one end of the spiral spring is fixed to the rotor, the spiral spring is wound by rotating the rotor in the prescribed direction so that the spiral spring is capable of biasing the second screw member in the prescribed direction.

8. The linear motion drive system according to claim 5, wherein a detachable guide member guides the first screw member toward said contact body but prohibits the same to rotate with respect to a casing of the pressure unit, and wherein the first screw member can be manually rotated when the guide member is detached.

* * * * *